United States Patent
Huang et al.

(10) Patent No.: US 12,505,219 B1
(45) Date of Patent: Dec. 23, 2025

(54) ONLINE UPDATING OF AN EDGE DEVICE OPERATING IN A SECURE COMPUTING ENVIRONMENT

(71) Applicant: Cisco Technology, Inc., San Jose, CA (US)

(72) Inventors: William Huang, Vaughan (CA); Joel Jacob, Etobicoke (CA); Neel Mehta, Toronto (CA); Anthony Ng, Toronto (CA); Rodrigo Paulo Quaresma, Burlington (CA); Warren Shum, Mississauga (CA); Alan Sung, Richmond Hill (CA); Jonathan Yeung, Mississauga (CA)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 18/428,496

(22) Filed: Jan. 31, 2024

Related U.S. Application Data

(63) Continuation-in-part of application No. 18/162,610, filed on Jan. 31, 2023.

(51) Int. Cl.
G06F 21/57 (2013.01)

(52) U.S. Cl.
CPC .................................. G06F 21/57 (2013.01)

(58) Field of Classification Search
CPC ...................................................... G06F 21/57
See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |

(Continued)

FOREIGN PATENT DOCUMENTS

| CN | 113052331 A | * | 6/2021 | ............. G06F 21/64 |
| CN | 113596036 A | * | 11/2021 | ............. G06F 21/45 |
| CN | 114237668 A | * | 3/2022 | ............... G06F 8/65 |

OTHER PUBLICATIONS

Splunk Enterprise 8.0.0 Overview, available online, retrieved May 20, 2020 from docs.splunk.com.

(Continued)

*Primary Examiner* — Richard G Keehn
(74) *Attorney, Agent, or Firm* — Kilpatrick Townsend & Stockton LLP

(57) ABSTRACT

Described herein is a technique to update an edge device deployed in a secure computing network. A repository connected to a public network stores build contents configured to update software installed on the edge device; the public network is inaccessible to devices within the secure computing environment. A second device connected to the public network acquires the build contents in a signed lockbox file. An edge device management service generates a lockbox file containing the build contents and a trusted signer outside the secure computing network signs the lockbox file. The second device connects to secure computing network and establishes communications with the edge device. The edge device verifies the signed lockbox file provided by the second device. Upon verification, the edge device extracts the contents of the signed lockbox file and updates the software installed on the edge device. Both offline and online updating approaches are described.

20 Claims, 18 Drawing Sheets

(56) References Cited

U.S. PATENT DOCUMENTS

| | | | |
|---|---|---|---|
| 8,416,954 B1* | 4/2013 | Raizen | G06F 16/13 |
| | | | 726/2 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2005/0144468 A1* | 6/2005 | Northcutt | G06F 21/10 |
| | | | 713/192 |
| 2015/0074409 A1* | 3/2015 | Reid | G06F 21/6218 |
| | | | 713/171 |
| 2015/0161409 A1* | 6/2015 | Szebeni | G06F 21/6218 |
| | | | 713/165 |
| 2016/0277374 A1* | 9/2016 | Reid | G06F 21/602 |
| 2018/0232526 A1* | 8/2018 | Reid | G06F 21/6218 |
| 2019/0098106 A1 | 3/2019 | Mungel et al. | |
| 2021/0014203 A1* | 1/2021 | Doshi | G06F 21/602 |
| 2021/0027559 A1* | 1/2021 | Fisher | G06Q 10/02 |
| 2021/0103530 A1* | 4/2021 | Don | G06F 21/602 |
| 2021/0385069 A1* | 12/2021 | Reid | G06F 21/32 |
| 2022/0075695 A1* | 3/2022 | Khan | G06F 21/78 |
| 2022/0179974 A1* | 6/2022 | Hetzler | G06F 21/602 |
| 2022/0404983 A1* | 12/2022 | Shelke | G06F 8/65 |
| 2022/0405171 A1* | 12/2022 | Shelke | G06F 11/1433 |
| 2023/0127607 A1* | 4/2023 | Fernandez Orellana | |
| | | | H04L 63/0209 |
| | | | 726/11 |
| 2023/0141909 A1* | 5/2023 | Truscott | G06F 21/568 |
| | | | 726/23 |
| 2023/0289225 A1* | 9/2023 | Singh | G06F 9/5011 |
| 2023/0315866 A1* | 10/2023 | Varteresian | G06F 21/53 |
| | | | 726/26 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, First presented at "Workshop on Managing Systems via Log Analysis and Machine Learning Techniques (SLAML)", Vancouver, British Columbia, Oct. 3, 2010.

\* cited by examiner

ONLINE UPDATING OF AN EDGE DEVICE OPERATING IN A SECURE COMPUTING ENVIRONMENT

CROSS-REFERENCES TO RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND OF THE INVENTION

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive and continues to grow rapidly. This technological evolution can give rise to various challenges in relation to collecting, managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing. Collecting and storing massive quantities of minimally processed or unprocessed data for later retrieval and analysis is becoming increasingly more feasible as new techniques are developed.

BRIEF DESCRIPTION OF THE DRAWINGS

Illustrative examples are described in detail below with reference to the following figures.

DETAILED DESCRIPTION OF THE INVENTION

Figure 1:
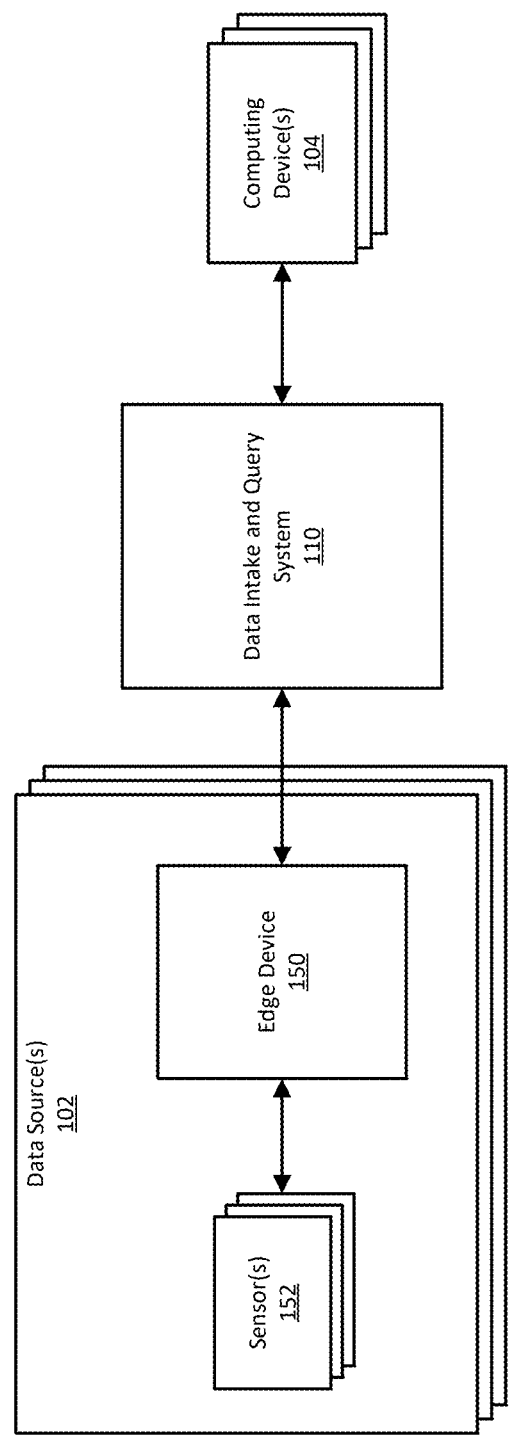
FIG. 1 illustrates a block diagram of an example data processing environment, in accordance with example implementations.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of techniques are used to collect and analyze machine data. For example, edge devices coupled with sensors can be deployed within the IT environment to collect machine data and send the machine data to a data intake and query system. In such configurations, the edge devices and sensors function as data sources for the data intake and query system. The system may parse the machine data to produce events that each has a portion of machine data associated with a timestamp, and then store the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

A number of services execute at the edge device to manage the movement of the machine data that is captured by the sensors and is transmitted by the edge device to the data intake and query system. In some instances, the services may communicate with each other as well as with the sensors using a particular messaging protocol. Many of the conventional messaging protocols are insufficient for at least one of a number of reasons, including, (1) the messaging protocol may require excessive bandwidth due to, for example, the header size and/or the packet size being too large, (2) the messaging protocol may not be resource friendly by, for example, requiring too much memory and processing power, (3) the messaging protocol may not be sufficiently secure and may not allow for encrypting connections between entities, and (4) the messaging protocol may not provide sufficient reliability by, for example, allowing for quality of service (QOS) flags.

These challenges and others can be addressed by the various examples of the present disclosure that, in some examples, provide for a messaging procedure employed at an edge device that enables efficient delivery of data to a data intake and query system. The edge device may include a system memory that has instructions stored therein for executing a message broker and a set of services. The message broker provides communication between a number of clients, which include the services running on the edge device as well as one or more sensors coupled to the edge device. The message broker may implement a topic-based publish-subscribe protocol in which messages are published by clients to certain topics and published messages are delivered to the clients that are subscribed to those topics. Each client may subscribe to one or more of the topics and the message broker may track these subscriptions by maintaining and updating a list of subscriptions.

In some examples, a configuration file that contains configuration data may be loaded onto the edge device after it is received from an external sender. The configuration data, which may be unpackaged by a data streamer service running on the edge device, may indicate which topics the data streamer service is to subscribe to and may further provide other instructions for modifying the operation of other services and sensors. In one example, the configuration data may include a request for anomaly data associated with a particular type of sensor data, and accordingly the data streamer service may subscribe to a topic for detected anomalies and an anomaly detection service may subscribe to a topic for that particular type of sensor data. Thereafter, the data streamer service may begin receiving published messages from the anomaly detection service that indicate whether an anomaly has been detected.

In another example, the configuration data may include a request for a particular type of sensor data and a particular measurement rate for that type of sensor data (e.g., a request for temperature measurements at 0.5 Hz), and accordingly the data streamer service may subscribe to a topic for that particular type of sensor data and may further send a message to the sensor(s) to make measurements at the particular measurement rate. After subscribing to the topic for the particular type of sensor data, the data streamer service may begin receiving published messages that include sensor data and measurements for the particular type of sensor data. The sensor data may then be sent in the form of output data from the data streamer service to the data intake and query system or to some other external recipient over one or more networks.

The figures herein follow a numbering convention in which the first digit or digits correspond to the figure number and the remaining digits identify an element or component in the figure. Similar elements or components between different figures may be identified by the use of similar digits. For example, 150 may reference element "50" in FIG. 1, and a similar element may be referenced as 250 in FIG. 2. As will be appreciated, elements shown in the various implementations herein can be added, exchanged, and eliminated so as to provide a number of additional implementations of the present disclosure.

FIG. 1 illustrates a block diagram of an example data processing environment 100. In the illustrated example, the data processing environment 100 includes one or more data sources 102, a data intake and query system 110, and one or more computing devices 104 (alternatively referred to as "client devices" or "client computing devices"). Each of the data sources 102 may include an edge device 150 that is communicatively coupled with one or more sensors 152. In some examples, the data processing environment 100 may be alternatively referred to as a "computing environment".

The data intake and query system 110, edge devices 150, and computing devices 104 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a computing device 104 can communicate with an edge device 150 via one or more networks. For example, if the edge device 150 is configured as a web server and the computing device 104 is a laptop, the laptop can communicate with the web server to view a website.

The computing devices 104 can correspond to distinct computing devices that can configure, manage, or sends queries to the system 110. Examples of the computing devices 104 may include, without limitation, smart phones, tablet computers, handheld computers, wearable devices, laptop computers, desktop computers, servers, portable media players, gaming devices, or other device that includes computer hardware (e.g., processors, non-transitory computer-readable media, etc.) and so forth. In certain cases, the computing devices 104 can include a hosted, virtualized, or containerized device, such as an isolated execution environment, that shares computing resources (e.g., processor, memory, etc.) of a particular machine with other isolated execution environments.

The computing devices 104 can interact with the system 110 and/or the edge devices 150 in a variety of ways. For example, the computing devices 104 can communicate with the system 110 and/or the edge devices 150 over an Internet (Web) protocol, via a gateway, via a command line interface, via a software developer kit (SDK), a standalone application, etc. As another example, the computing devices 104 can use one or more executable applications or programs to interface with the system 110.

The edge devices 150 can correspond to distinct computing devices or systems that include or have access to data that can be ingested, indexed, and/or searched by the system 110. The edge devices 150 can include, but are not limited to, servers, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory computer-readable media, etc.). In some examples, the edge devices 150 may receive the data from the sensors 152 that is to be processed by the system 110. As such, each one of the edge devices 150 and its associated sensors 152 may constitute one of the data sources 102.

The types of data that are generated by each of the data sources 102 (and consequently by each of the edge devices 150) can include machine data such as, for example and without limitation, server log files, activity log files, configuration files, messages, network packet data, performance measurements, sensor measurements, etc. In some cases, one or more applications executing on the edge devices 150 may generate various types of machine data during operation. For example, a web server application executing on one of the edge devices 150 may generate one or more web server logs detailing interactions between the web server and any number of the computing devices 104 or other devices.

As another example, one of the edge devices 150 may be implemented as a router and may generate one or more router logs that record information related to network traffic managed by the router. As yet another example, a database server application executing on one of the edge devices 150 may generate one or more logs that record information related to requests sent from other devices (e.g., web servers, application servers, client devices, etc.) for data managed by the database server. Similarly, one of the edge devices 150 may generate and/or store computing resource utilization metrics, such as, but not limited to, CPU utilization, memory utilization, number of processes being executed, etc. Any one or any combination of the files or data generated in such cases can be used as a data source for the system 110.

As used herein, obtaining data from one of the data sources 102 may refer to communicating with one of the edge devices 150 to obtain data from the edge device 150 (e.g., from the sensors 152 associated with the edge device 150 or some other data streams or directories on the edge device 150, etc.). For example, obtaining data from one of the data sources 102 may refer to requesting data from one of the edge devices 150 and/or receiving data from the edge device 150. In some such cases, the edge device 150 can retrieve and return the requested data and/or the system 110 can retrieve the data from the edge device 150 (e.g., from a particular file stored on the edge device 150).

The data intake and query system 110 can ingest, index, and/or store data from heterogeneous data sources and/or edge devices 150. For example, the system 110 can ingest, index, and/or store any type of machine data, regardless of the form of the machine data or whether the machine data matches or is similar to other machine data ingested, indexed, and/or stored by the system 110. In some cases, the system 110 can generate events from the received data, group the events, and store the events in buckets. The system 110 can also search heterogeneous data that it has stored or search data stored by other systems (e.g., other system 110 systems or other non-system 110 systems). For example, in response to received queries, the system 110 can assign one or more components to search events stored in the storage system or search data stored elsewhere.

As will be described herein in greater detail below, the system 110 can use one or more components to ingest, index, store, and/or search data. In some implementations, the system 110 is implemented as a distributed system that uses multiple components to perform its various functions. For example, the system 110 can include any one or any combination of an intake system to ingest data, an indexing system to index the data, a storage system to store the data, and/or a query system (or search system) to search the data, etc. In some cases, the components of the system 110 are implemented as distinct computing devices having their own computer hardware (e.g., processors, non-transitory computer-readable media, etc.) and/or as distinct hosted devices (e.g., isolated execution environments) that share computing resources or hardware in a shared computing resource environment.

The intake system can receive data from the edge devices 150, perform one or more preliminary processing operations on the data, and communicate the data to the indexing system, query system, storage system, or to other systems (which may include, for example, data processing systems, telemetry systems, real-time analytics systems, data stores, databases, etc., any of which may be operated by an operator of the system 110 or a third party). Given the amount of data that can be ingested by the intake system, in some implementations, the intake system can include multiple distributed computing devices or components working concurrently to ingest the data. The preliminary processing operations performed by the intake system can include, but is not limited to, associating metadata with the data received from the edge devices 150, extracting a timestamp from the data, identifying individual events within the data, extracting a subset of machine data for transmittal to the indexing system, enriching the data, etc.

In some environments, a user of a system 110 may install and configure, on computing devices owned and operated by the user, one or more software applications that implement some or all of the components of the system 110. For example, with reference to FIG. 1, a user may install a software application on server computers owned by the user and configure each server to operate as one or more components of the intake system, indexing system, query system, shared storage system, or other components of the system 110. This arrangement generally may be referred to as an "on-premises" solution. That is, the system 110 is installed and operates on computing devices directly controlled by the user of the system 110. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 110 operate.

In certain examples, one or more of the components of the system 110 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 110 by managing computing resources configured to implement various aspects of the system and by providing access to the system to end users via a network. Typically, a user may pay a subscription or other fee to use such a service. Each subscribing user of the cloud-based service may be provided with an account that enables the user to configure a customized cloud-based system based on the user's preferences.

Implementing the system 110 in a shared computing resource environment can provide a number of benefits. In some cases, implementing the system 110 in a shared computing resource environment can make it easier to install, maintain, and update the components of the system 110. For example, rather than accessing designated hardware at a particular location to install or provide a component of the system 110, a component can be remotely instantiated or updated as desired. Similarly, implementing the system 110 in a shared computing resource environment or as a cloud-based service can make it easier to meet dynamic demand. For example, if the system 110 experiences significant load at indexing or search, additional compute resources can be deployed to process the additional data or queries. In an "on-premises" environment, this type of flexibility and scalability may not be possible or feasible.

Figure 2:
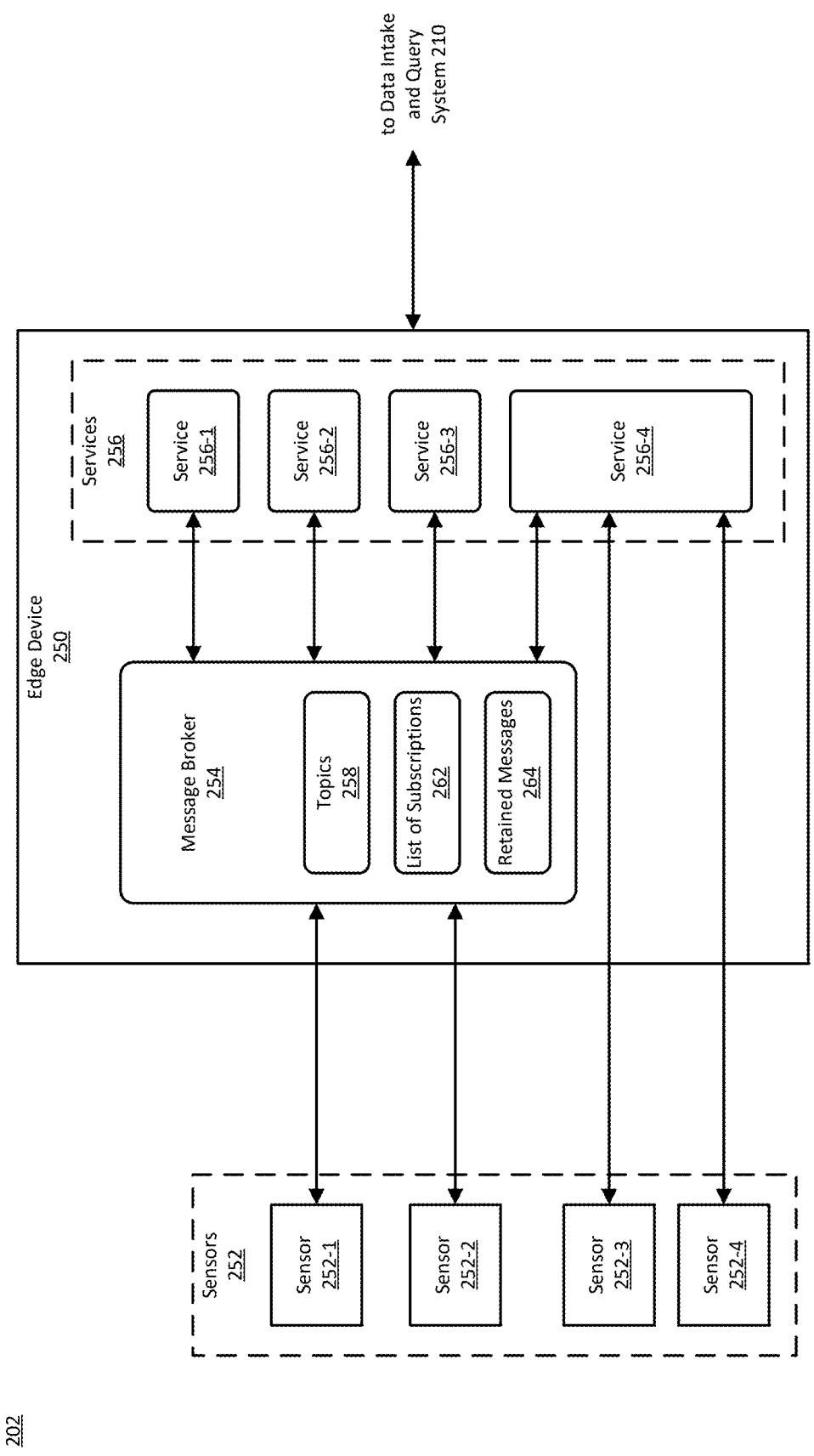
FIG. 2 illustrates a block diagram of an example data source, in accordance with example implementations.

FIG. 2 illustrates a block diagram of an example data source 202. In the illustrated example, the data source 202 includes an edge device 250 that is communicatively coupled to a set of sensors 252. The edge device 250 may include various hardware elements and software application programs that may be used by the hardware elements. For example, the edge device 250 may include a message broker 254 and a set of services 256 that are configured to run on the edge device 250. For example, instructions for executing the message broker 254 and the services 256 may be stored on the system memory of the edge device 250 and, upon startup of the edge device 250, these instructions may be sequentially loaded into one or more processors of the edge device 250 so that these programs are caused to run on the edge device 250 to carry out the functionalities described below.

The message broker 254 is executed by the edge device 250 to provide communication between the various software and hardware entities within the data processing environment. For example, the message broker 254 may receive and send messages between several clients in accordance with a publish-subscribe network protocol. In some examples, the message broker 254 may implement a topic-based publish-subscribe protocol in which messages are published by clients on certain topics and the published messages are delivered by the message broker 254 to the clients that are subscribed to those topics. Clients may subscribe to one or more topics and the message broker 254 may track these subscriptions by maintaining a list of each subscription.

The message broker 254 may directly or indirectly communicate with a number of clients, which may include one or more of the sensors 252 and one or more of the services 256. Each of the clients may subscribe to one of a number of topics 258 that are maintained by the message broker 254. The topics 258 may be a file or data structure that is prepopulated with the possible topics to which a client may subscribe or, in some examples, the topics 258 may be updated over time. For example, additional topics may be added to the topics 258 once the topic is first subscribed or published to, and topics may be removed from the topics 258 once the last client unsubscribes from the topic.

The message broker 254 may maintain a list of subscriptions 262 to track the client subscriptions. In general, the list of subscriptions 262 may include one or more subscriptions that indicate which of the set of clients are subscribed to which of the topics 258. The list of subscriptions 262 may be a file or data structure that is prepopulated with the subscriptions or, in some examples, is updated over time by, for example, adding a subscription each time a client subscribes to a topic to which the client was not previously subscribed, and removing a subscription each time a client unsubscribes from a topic. As described above, a client may subscribe to a topic that is previously listed in the topics 258 or is a new topic that may then be added to the topics 258.

In some examples, the message broker 254 may maintain a set of retained messages 264 that includes recent published messages received by the message broker 254. In some examples, the retained messages 264 may be used to allow newly-subscribed clients to a topic to receive messages that were published prior to the clients being subscribed. In some examples, the publish-subscribe protocol may not require that at least one client must first be subscribed to a particular topic before any message can be published to that topic, and therefore a client that publishes a message has no guarantee that a subscribing client actually receives the message. By maintaining the retained messages 264, clients may receive messages that they would otherwise have missed and, furthermore, a published message may be more likely to be received by a desired recipient. In various examples, the retained messages 264 may store the N most recent published messages, all messages published within the last T amount of time, or the N most recent published messages received within the last T amount of time, among other possibilities.

As noted above, clients of the message broker 254 may include any of the sensors 252 and any of the services 256. In various examples, one or more of the sensors 252 may be clients of the message broker 254 via direct communication with the message broker 254 or via one of the services 256 that may act as an intermediary between the message broker 254 and the sensors 252. For example, in the illustrated implementation, the sensors 252-1 and 252-2 may be clients of and may communicate directly with the message broker 254 while the sensors 252-3 and 252-4 may be clients of the message broker 254 and may communicate via service 256-4, which may act as a sensor manager service that causes a connected sensor to perform various actions that change the operation of the connected sensor (e.g., turn on/off the sensor, increase/decrease the rate that sensor data is captured or transmitted).

Further in the illustrated example, the services 256-1, 256-2, and 256-3 may be clients of the message broker 254 and may communicate directly with the message broker 254 (e.g., by virtue of being executed on the same hardware). The services 256 may publish messages on certain topics and subscribe to certain topics so as to receive messages published to those topics. One or more of the services 256 may communicate with a data intake and query system 210 by, for example, receiving requests from the system 210 to subscribe to certain topics that the system 210 is interested in, and transmit messages published on those topics to the system 210.

The sensors 252 may include one or more of a variety of sensor types such as, without limitation, a light sensor, an image capture sensor, a sound sensor, a vibration sensor, an accelerometer, a gyroscope, a pressure sensor, a humidity sensor, a gas sensor, a location sensor, among other possibilities. While the sensors 252 are shown as being external to the edge device 250, the sensors 252 may include a combination of internal and external sensors. For example, the sensors 252 may include an internal vibration sensor and/or an external vibration sensor that provide vibration measurements within the edge device 250 and of the external environment, respectively. External sensors may provide measurement data corresponding to a target device that is located within the data processing environment, such as a server computer, to which one or more of the sensors 252 are attached.

Figure 3:
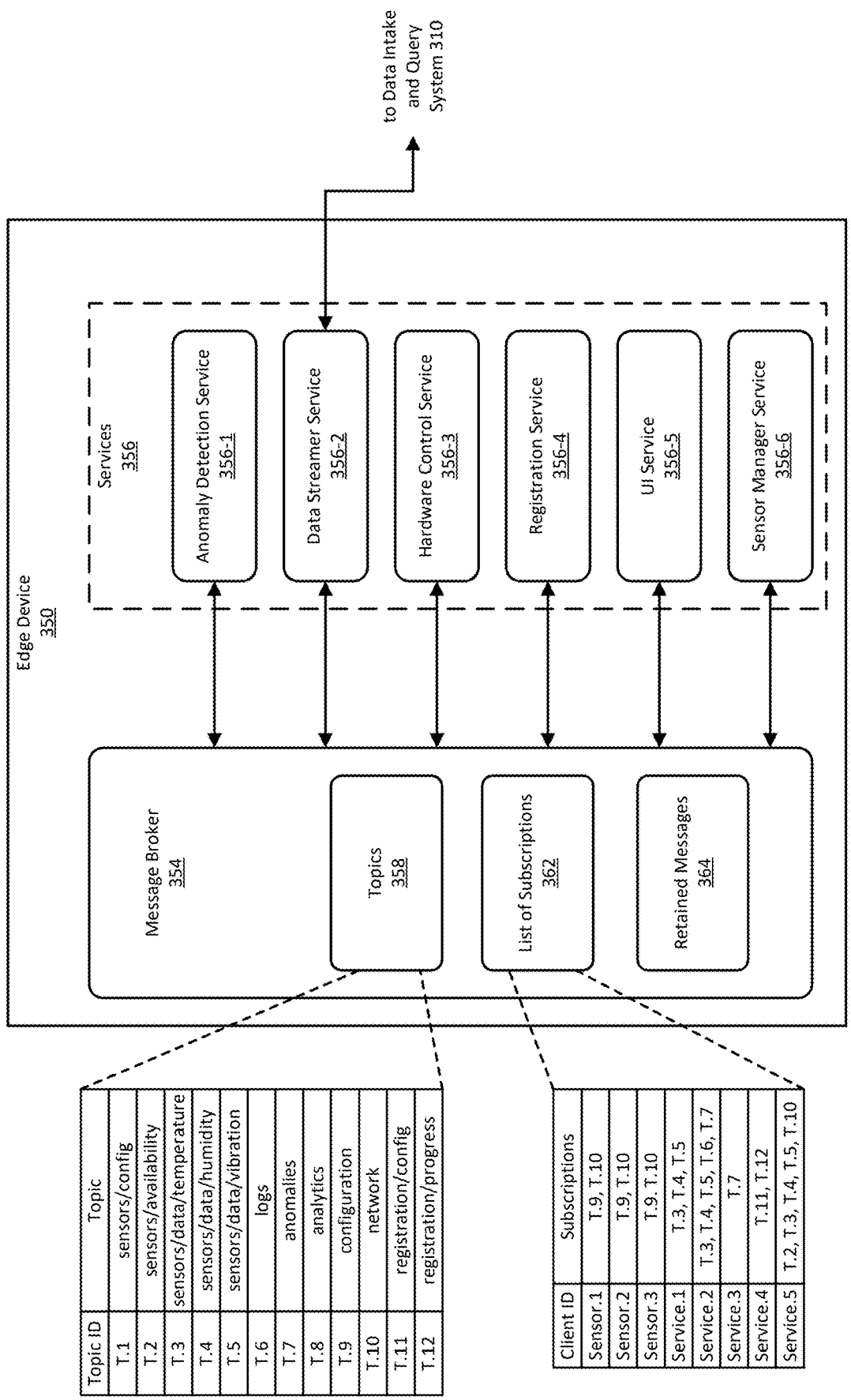
FIG. 3 illustrates a block diagram of an example edge device, in accordance with example implementations.

FIG. 3 illustrates a block diagram of an example edge device 350. In the illustrated example, the edge device 350 includes a message broker 354 and a set of services 356 that are configured to run on the edge device 350. The message broker 354 may maintain a set of topics 358, a list of subscriptions 362, and a set of retained messages 364. In the illustrated example, a set of topic IDs and client IDs are used by the message broker 354 to distinguish between different topics and clients, respectively.

The illustrated example may represent the contents of the topics 358 and the list of subscriptions 362 at a particular point in time while the message broker 354 is running on the edge device 350. The topics 358 include Topics T.1-T.12, which include topics for different types of sensor measurements, including Topic T.3 for temperature measurements, Topic T.4 for humidity measurements, and Topic T.5 for vibration measurements, as well as topics related to logs (Topic T.6) and anomalies (Topic T.7), among others. As described above, the number of topics in the topics 358 may increase or decrease when new topics are subscribed to or published on or when topics are no longer being subscribed to or published on.

The list of subscriptions 362 includes subscriptions for clients corresponding to sensors as well as clients corresponding to the services 356. In the illustrated example, the list of subscriptions 362 includes that Client Sensor.1 is subscribed to Topics T.9 and T.10, that Client Service.1 is subscribed to Topics T.3, T.4, and T.5, among others. As shown, multiple clients may be subscribed to a single topic, such as each of Clients Sensor.1, Sensor.2, and Sensor.3 being subscribed to Topics T.9 and T.10. Furthermore, sensor clients as well as service clients may be subscribed to a same topic, such as Clients Sensor.1 and Service.5 being subscribed to Topic T.10.

The illustrated example also shows several examples for services 356, including an anomaly detection service 356-1, a data streamer service 356-2, a hardware control service 356-3, a registration service 356-4, a user interface (UI) service 356-5, and a sensor management service 356-6. In some examples, the anomaly detection service 356-1 may collect certain sensor data acquired by the sensors and detect anomalies associated with the sensor data. The anomaly detection service 356-1 may employ one or more machine learning (ML) models, where various sensor data is inputted into one or more ML models to generate an output indicative of whether an anomaly was detected. For example, temperature data may be received by the anomaly detection service 356-1 and be inputted into a specific temperature ML model in order to identify anomalies and/or other alert conditions associated with a target operating temperature of a target device, the surrounding environment, or of the edge device 350 itself.

In some examples, the data streamer service 356-2 may transmit data collected at the edge device 350 to a data intake and query system 310. The data streamer service 356-2 may subscribe to one or more of the topics 358 in accordance with a configuration file or configuration data, which may be obtained (e.g., received) by the data streamer service 356-2 from an external device, such as the system 310. For example, a configuration file received by the data streamer service 356-2 may indicate that certain sensor data (e.g., temperature data) is to be sent to the system 310. The data streamer service 356-2 may then subscribe to the corresponding topic (e.g., Topic T.3) and relay data contained in any published messages back to the system 310.

The hardware control service 356-3 may control and manage the hardware components of the edge device 350. The registration service 356-4 may register the edge device 350 with a remote application running on a remote device, allowing the remote device to send configuration data to the edge device 350 for modifying the functionality of one or more of the services 365. The UI service 365-5 may manage the UI of the edge device 350 as well as any other I/O devices connected to or integrated with the edge device 350. The sensor management service 356-6 may communicate with one or more connected sensors and perform various actions that change the operation of the sensors (e.g., increase the rate that certain sensor data is measured and/or transmitted).

Figure 4:
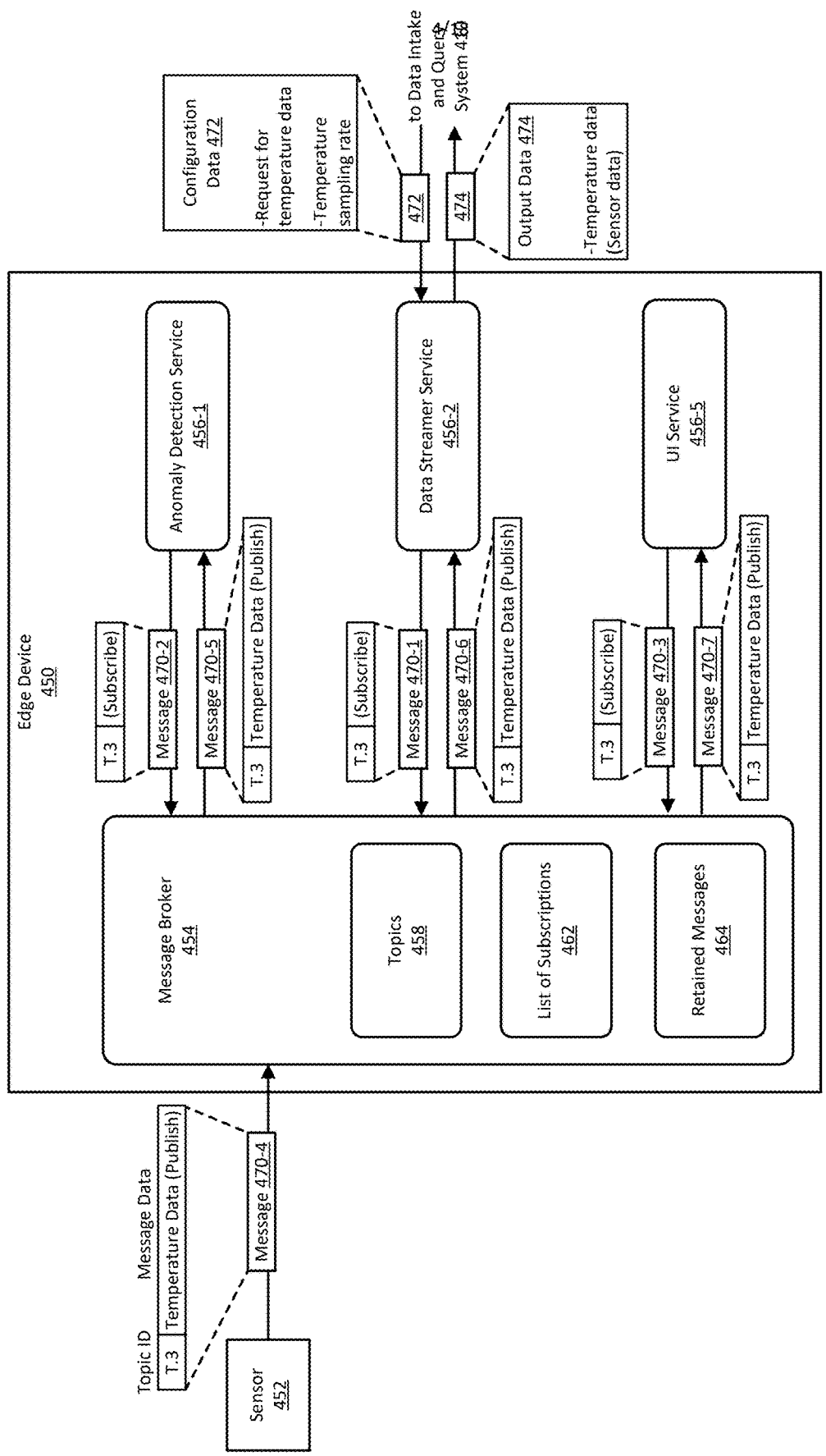
FIG. 4 illustrates an example operation of an edge device upon receiving configuration data from an external sender, in accordance with example implementations.

FIG. 4 illustrates an example operation of an edge device 450 upon receiving configuration data 472 from a sender that is external to the edge device 450. In the illustrated example, the edge device 450 includes a message broker 454 and a set of services 456 including an anomaly detection service 456-1, a data streamer service 456-2, and a UI service 456-5 that are configured to run on the edge device 450. The message broker 454 may maintain a set of topics 458, a list of subscriptions 462, and a set of retained messages 464, and may facilitate the sending and receiving of messages 470 between clients. The message broker 454 may be communicatively coupled to the sensor 452, which may be external or internal to the edge device 450.

In the illustrated example, the configuration data 472 is received by the edge device 450 (e.g., by the data streamer service 456-2) from an external sender. In various examples, the data streamer service 456-2 may obtain the configuration data 472 using a variety of techniques. In one example, the data streamer service 456-2 may obtain the configuration data 472 directly from the external sender. In another example, a separate service running on the edge device 550 (referred to as the "pulse service") may receive the configuration data 472 from the external sender and may publish a message containing the configuration data 472 on a particular topic for configuration data (such as Topic T.9) by sending the message to the message broker. The data streamer service 456-2, which may have previously subscribed to the particular topic, may receive the published message from the message broker containing the configuration data. As such, in some examples, the data streamer service 456-2 may obtain the configuration data 472 via the message broker 354 by subscribing to a particular topic for configuration data.

In various examples, the external sender may be a data intake and query system 410, a computing or client device, a mobile device that is wirelessly connected to the edge device 450, among other possibilities. In general, the configuration data 472 may include data for modifying the operation of clients of the message broker 454, including the services 456 and the sensor 452. The configuration data 472 may be received in the form of a configuration file.

In the illustrated example, the configuration data 472 includes a request for temperature data (which is an example of a type of sensor data) and further specifies a particular temperature sampling rate (which is an example of a sensor sampling rate). The data streamer service 456-2 may parse the configuration data 472 to identify the request for temperature data as well as the specified temperature sampling rate. In response to the data streamer service 456-2 obtaining the configuration data 472, the data streamer service 456-2 may send a message 470-1 to the message broker 454 to subscribe to Topic T.3 (i.e., the topic for temperature measurements). The data streamer service 456-2 may also cause the sensor 452 (e.g., through the sensor manager service) to modify its temperature sampling rate to the specified temperature sampling rate.

In response to receiving the message 470-1, the message broker 454 may update the list of subscriptions 462 to indicate that the data streamer service 456-2 is subscribed to Topic T.3. In some examples, the message broker 454 may update the topics 458 to include Topic T.3 or, alternatively, prior to updating the list of subscriptions 462, the message broker 454 may verify that Topic T.3 is included in the topics 458. Optionally, further in response to the data streamer service 456-2 obtaining the configuration data 472, the anomaly detection service 456-1 and the UI service 456-5 may be caused to send messages 470-2 and 470-3, respectively, to the message broker 454 to subscribe to Topic T.3. In response to receiving the messages 470-2 and 470-3, the message broker 454 may update the list of subscriptions 462 to indicate that the anomaly detection service 456-1 and the UI service 456-5 are subscribed to Topic T.3.

Thereafter, the sensor 452 may perform one or more temperature measurements at the specified temperature sampling rate. These measurements may be included in a message 470-4 (in the form of temperature data), which may be sent by the sensor 452 to the message broker 454 to publish the message 470-4 on Topic T.3. In response to receiving the message 470-4, the message broker 454 may examine the list of subscriptions 462 to identify which clients are subscribed to Topic T.3. After identifying that each of the services 456-1, 456-2, and 456-5 is subscribed to Topic T.3, the message broker 454 may send the messages 470-5, 470-6, and 470-7 to the services 456-1, 456-2, and 456-5, respectively, with each of these sent published messages including the same temperature data from the message 470-4.

In response to receiving the message 470-6, the data streamer service 456-2 may prepare output data 474 that includes the temperature data and send the output data 474 to the system 410 for processing as described herein. In response to receiving the message 470-5, the anomaly detection service 456-1 may analyze the temperature data to possibly detect any anomalies in the data. In response to receiving the message 470-7, the UI service 456-5 may adjust the display of the edge device 450 to display the temperature measurements captured by the sensor 452.

Figure 5:
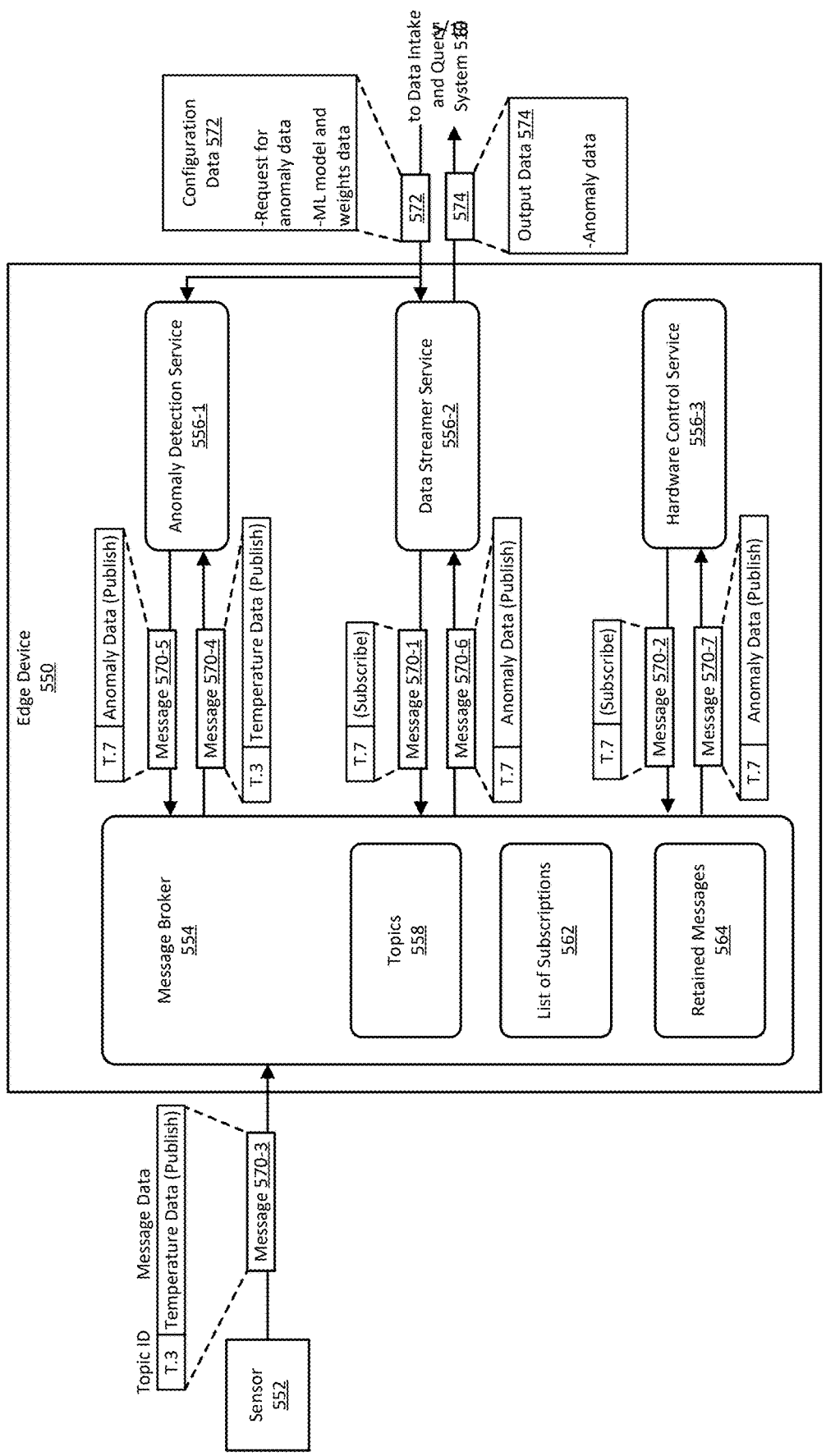
FIG. 5 illustrates an example operation of an edge device upon receiving configuration data from an external sender, in accordance with example implementations.

FIG. 5 illustrates an additional example operation of an edge device 550 upon receiving configuration data 572 from a sender that is external to the edge device 550. In the illustrated example, the edge device 550 includes a message broker 554 and a set of services 556 including an anomaly detection service 556-1, a data streamer service 556-2, and a hardware control service 556-5 that are configured to run on the edge device 550. The message broker 554 may maintain a set of topics 558, a list of subscriptions 562, and a set of retained messages 564, and may facilitate the sending and receiving of messages 570 between clients. The message broker 554 may be communicatively coupled to the sensor 552, which may be external or internal to the edge device 550.

In the illustrated example, the configuration data 572 is received by the edge device 550 (e.g., obtained and/or received by the anomaly detection service 556-1 and the data streamer service 556-2) from an external sender. In various examples, the external sender may be a data intake and query system 510, a computing or client device, a mobile device that is wirelessly connected to the edge device 550, among other possibilities. In general, the configuration data 572 may include data for modifying the operation of clients of the message broker 554, including the services 556 and the sensor 552. The configuration data 572 may be received in the form of a configuration file.

In the illustrated example, the configuration data 572 includes a request for anomaly data and further provides a ML model and associated weights to be used by the anomaly detection service 556-1. The configuration data 572 is obtained by the data streamer service 556-2 and optionally by the anomaly detection service 556-1. The data streamer service 556-2 may parse the configuration data 572 to identify the request for anomaly data as well as the ML model and associated weights. In response to the data streamer service 556-2 obtaining the configuration data 572, the data streamer service 556-2 may send a message 570-1 to the message broker 554 to subscribe to Topic T.7 (i.e., the topic for anomaly data). The data streamer service 556-2 may also cause the anomaly detection service 556-1 to load the ML model and associated weights to be used for processing received sensor data.

In response to receiving the message 570-1, the message broker 554 may update the list of subscriptions 562 to indicate that the data streamer service 556-2 is subscribed to Topic T.7. In some examples, the message broker 554 may update the topics 558 to include Topic T.7 or, alternatively, prior to updating the list of subscriptions 562, the message broker 554 may verify that Topic T.7 is included in the topics 558. Further in response to the data streamer service 556-2 and/or the anomaly detection service 556-1 obtaining the configuration data 572, the anomaly detection service 556-1 may send a message (not shown) to the message broker 554 to subscribe to one or more topics that are related to the input data for the ML model (e.g., topics related to temperature data or other sensor data). For example, the anomaly detection service 556-1 may subscribe to Topic T.3. Optionally, in response to the data streamer service 556-2 obtaining the configuration data 572, the hardware control service 556-3 may be caused to send a message 570-2 to the message broker 554 to subscribe to Topic T.7. In response to receiving the messages 570-2, the message broker 554 may update the list of subscriptions 562 to indicate that the hardware control service 556-3 is subscribed to Topic T.7.

Thereafter, the sensor 552 may perform one or more temperature measurements. These measurements may be included in a message 570-3 (in the form of temperature data), which may be sent by the sensor 552 to the message broker 554 to publish the message 570-3 on Topic T.3. In response to receiving the message 570-3, the message broker 554 may examine the list of subscriptions 562 to identify which clients are subscribed to Topic T.3. After identifying that the anomaly detection service 556-1 is subscribed to Topic T.3, the message broker 554 may send the messages 570-4 to the anomaly detection service 556-1, with the sent published message including the same temperature data from the message 570-3.

In response to receiving the message 570-4, anomaly detection service 556-1 may provide the temperature data as input to the ML model, which may produce an output that indicates whether or not an anomaly was detected. In the case where the output of the ML model indicates that an anomaly was detected based on the temperature data, the anomaly detection service 556-1 may generate a message 570-5 that includes anomaly data that identifies the detected anomaly. The message 570-5 is sent by the anomaly detection service 556-1 to the message broker 554 to publish the message 570-5 on Topic T.7.

In response to receiving the message 570-5, the message broker 554 may examine the list of subscriptions 562 to identify which clients are subscribed to Topic T.7. After identifying that each of the services 556-2 and 556-3 is subscribed to Topic T.7, the message broker 554 may send the messages 570-6 and 570-7 to the services 556-2 and 556-3, respectively, with each of these sent published messages including the same anomaly data from the message 570-5. In response to receiving the message 570-6, the data streamer service 556-2 may prepare output data 574 that includes the anomaly data and send the output data 574 to the system 510 for processing as described herein. In response to receiving the message 570-7, the hardware control service 556-3 may control one or more hardware elements of the edge device 550 based on the detected anomaly. For example, the hardware control service 556-3 may need to power off or reset the device, or cause warning indicators (e.g., LED lights) to be triggered to alert a user of the edge device 550 as to the detected anomaly.

Figure 6:
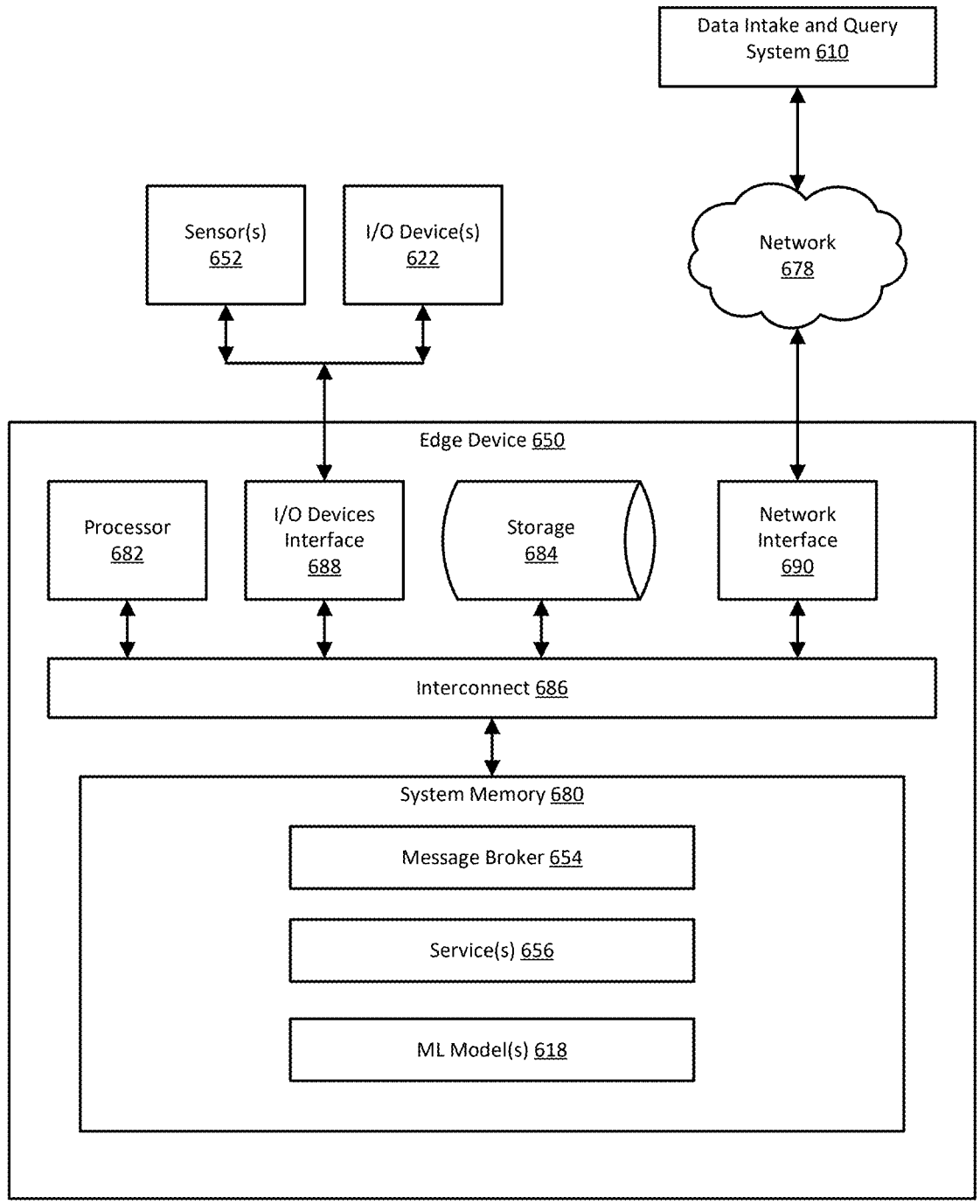
FIG. 6 illustrates a block diagram of an example edge device within a data processing environment, in accordance with example implementations.

FIG. 6 illustrates a block diagram of an example edge device 650 within a data processing environment 600. As shown, the data processing environment 600 may include, without limitation, a data intake and query system 610 and an edge device 650 communicating with one another over one or more communications networks 678. The edge device 650 may include, without limitation, a processor 682, storage 684, an input/output (I/O) device interface 688, a network interface 690, an interconnect 686, and system memory 680. The system memory 680 may include a message broker 654, one or more services 656, and one or more ML models 618.

In general, the processor 682 may retrieve and execute programming instructions stored in the system memory 680, such as the message broker 654, the services 656, and ML models 618, and any operating system stored therein. The processor 682 may be any technically-feasible form of a processing device configured to process data and execute program code. The processor 682 could be, for example, a central processing unit (CPU), a graphics processing unit (GPU), an application-specific integrated circuit (ASIC), a field-programmable gate array (FPGA), and so forth. The processor 682 stores and retrieves application data residing in the system memory 680. The processor 682 is included to be representative of a single CPU, multiple CPUs, a single CPU having multiple processing cores, and the like. In operation, the processor 682 is the manager processor of the edge device 650, controlling and coordinating operations of the other system components.

The storage 684 may be a disk drive storage device. Although shown as a single unit, the storage 684 may be a combination of fixed and/or removable storage devices, such as fixed disc drives, floppy disc drives, tape drives, removable memory cards, or optical storage, network attached storage (NAS), or a storage area-network (SAN). The processor 682 may communicate to other computing devices and systems via the network interface 690, where the network interface 690 is configured to transmit and receive data via the communications network 678.

The interconnect 686 facilitates transmission, such as of programming instructions and application data, between the processor 682, the input/output (I/O) device interface 688, the storage 684, the network interface 690, and the system memory 680. The I/O device interface 688 is configured to transmit and receive data to and from one or more sensors 652 and I/O devices 622. The I/O devices 622 may include one or more input devices (e.g., a keyboard, buttons, stylus, microphone, etc.) and/or one or more output devices (e.g., speaker, light-emitting diodes, etc.). In some instances, the I/O devices 622 includes a display device that displays an image and, in some examples, is integrated with the edge device 650. In various examples, the display device 622 may be a liquid crystal display (LCD) display, organic light-emitting diode (OLED) display, or a digital light processing (DLP) display. In some instances, the sensors 652 may include a camera that acquires images via a lens and converts the images into digital form, which may then be displayed on the display device.

The sensors 652 may include one or more of a variety of sensor types such as, without limitation, a light sensor, an image capture device (e.g., a camera), a sound sensor (e.g., microphone), a vibration sensor, one or more accelerometers (for measuring accelerations in one or more directions), one or more gyroscopes (for measuring rotations in one or more directions), a pressure sensor, a humidity sensor, a gas sensor (e.g., a $CO_2$ sensor), a location sensor (e.g., a Global Navigation Satellite System (GNSS) receiver), among other possibilities. While the sensors 652 are shown as being external to the edge device 650, the sensors 652 may be internal or external to edge device 650. For example, the sensors 652 may include an internal vibration sensor and/or an external vibration sensor that provide vibration measurements within the edge device 650 and of the external environment, respectively. External sensors may provide measurement data corresponding to a target device, such as a server computer, to which one or more of the sensors 652 are attached.

The services 656 may include a sensor manager service that may cause one or more of the sensors 652 to perform various actions that change the operation of the sensors 652 (e.g., increase rate that sensor data is transmitted) and/or the operation of the sensors 652 (e.g., turn on a camera and/or a microphone, etc.). The edge device 650 may execute the message broker 654 to communicate with other devices within the data processing environment 600. For example, the message broker 654 could receive sensor data from one or more of the sensors 652 and may send the data to the data intake and query system 610. In various examples, the edge device 650 may process the received data. For example, the edge device 650 may retrieve one or more of the ML models 618 in order to process incoming data. In some implementations, the one or more ML models 618 are locally stored in the system memory 680 and locally updated at the edge device 650 without receiving updates from another device.

Figure 7:
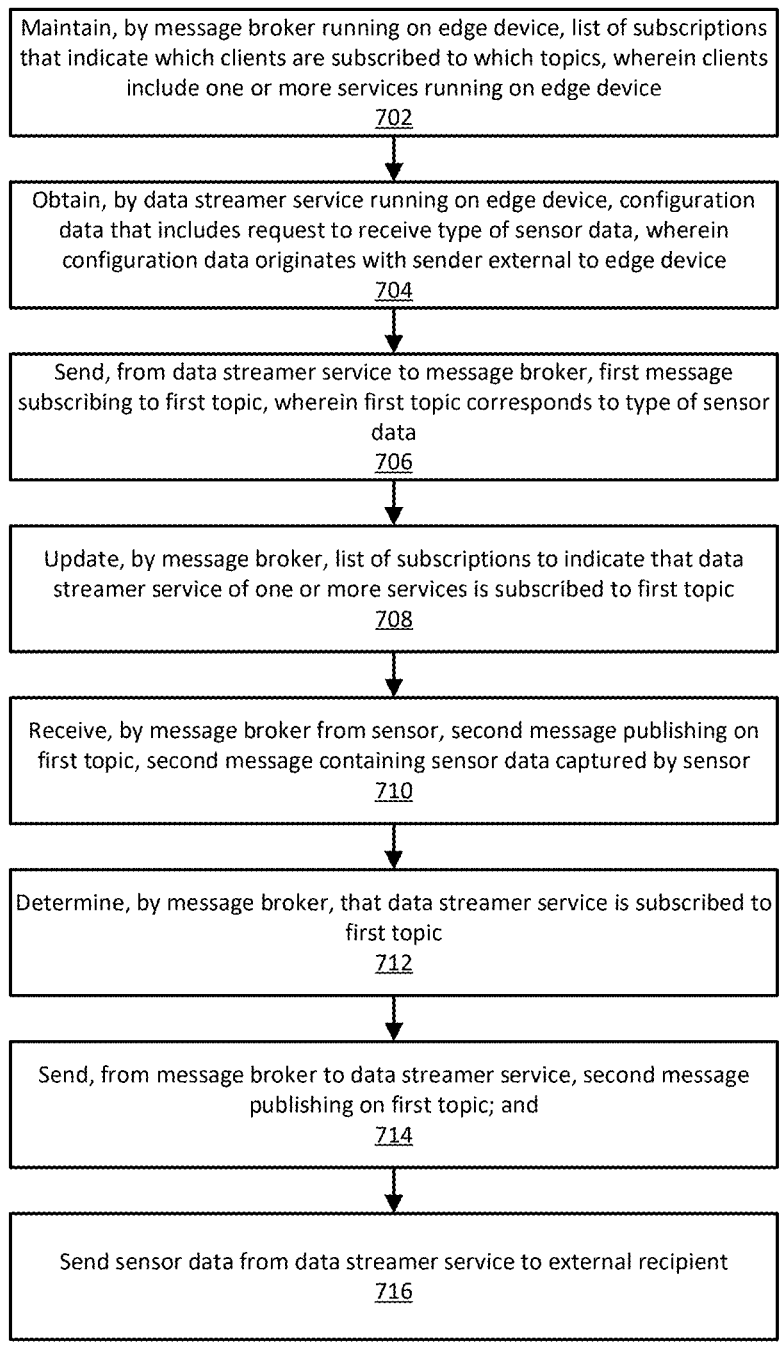
FIG. 7 illustrates a flowchart of an example process for delivering data from an edge device to an external recipient using a publish-subscribe protocol, in accordance with example implementations.

FIG. 7 illustrates a flowchart of an example process 700 for delivering data from an edge device to an external recipient using a publish-subscribe protocol. The example process 700 can be implemented, for example, by a device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, case the one or more processors to perform the operations of the process 700 of FIG. 7.

At step 702, a list of subscriptions (e.g., list of subscriptions 262, 362, 462, 562) is maintained by a message broker (e.g., message brokers 254, 354, 454, 554, 654) running on an edge device (e.g., edge devices 150, 250, 350, 450, 550,

650). The list of subscriptions may indicate which of a set of clients are subscribed to which of a set of topics (e.g., topics 258, 358, 458, 558). The set of clients may include one or more services (e.g., services 256, 356, 456, 556, 656) running on the edge device.

At step 704, configuration data (e.g., configuration data 472, 572) is obtained by a data streamer service (e.g., data streamer services 356-2, 456-2, 556-2) running on the edge device. The configuration data may include a request to receive a type of sensor data. The configuration data may alternatively or additionally include a request to receive anomaly data. The configuration data may alternatively or additionally include a ML model and associated weights to be used for generating the anomaly data. The configuration data may originate with a sender that is external to the edge device. The sender may be a user computing device (e.g., computing devices 104), a data intake and query system (e.g., data intake and query systems 110, 210, 310, 410, 510, 610), or a server that is communicatively coupled to the edge device via a wireless connection.

At step 706, a first message (e.g., message 570-1) subscribing to a first topic is sent from the data streamer service to the message broker. The first topic may correspond to the type of sensor data.

At step 708, the list of subscriptions is updated by the message broker to indicate that the data streamer service of the one or more services is subscribed to the first topic of the set of topics.

At step 710, a second message (e.g., message 570-3) publishing on the first topic is received by the message broker. The second message may contain sensor data captured by a sensor (e.g., sensors 152, 252, 452, 552, 652). The sensor data may include sensor measurements captured by the sensor. The set of clients may include the sensor. The sensor may generate the sensor data based on the sensor measurements, generate the second message to include the sensor data, and send the second message to the message broker. The second message may be received by the message broker via a sensor manager service (e.g., sensor manager services 356-6) that is included in the one or more services. The sensor manager service may receive the sensor measurements from the sensor and generate the second message based on the sensor measurements.

At step 712, it is determined by the message broker that the data streamer service is subscribed to the first topic. The message broker may, for example, search the list of subscriptions to determine that the data streamer service is subscribed to the first topic. Step 712 may be performed in response to the message broker receiving the second message publishing on the first topic.

At step 714, the second message (e.g., message 470-6) publishing on the first topic is sent from the message broker to the data streamer service. In response to receiving the second message, the data streamer service may extract the sensor data from the second message.

At step 716, the sensor data is sent from the data streamer service to an external recipient. The sensor data may be sent in the form of output data (e.g., output data 474, 574) to the external recipient. The output data may further include anomaly data generated by the anomaly detection service. The external recipient may be the user computing device or the data intake and query system. In response to receiving the sensor data (and/or the anomaly data), the data intake and query system may parse, index, store, and search the sensor data (and/or the anomaly data) as described herein.

Edge devices address several challenges related to transmitting physical sensor data into a data intake and query system, such as difficulties in integrating sensors that use proprietary communication formats or generate sensor data into repositories that cannot be accessed by certain devices due to security or compliance concerns. One such security limitation is a security policy that restricts third party services from accessing a secure computing network. Such a secure computing network substantially restricts or prevents devices within the secure computing network from communicating with devices outside of the secure computing network. A conventional solution for such situations involves installing customized edge devices that gathered sensor data within the secure computing network. Such edge devices would collect sensor data and transmit the sensor data to an on-premises data intake and query system located within the secure computing network.

One drawback with conventional approaches for implementing edge devices within secure computing networks is that such approaches have difficulty managing complex structural changes or updates to software installed on the edge device. Conventional edge devices are configured to receive updates from a trusted source via over-the-air (OTA) communications to a device in a public network storing the applicable update files. However, an edge device deployed in a secure computing network cannot access the public network and is therefore unable to acquire the update files. As a result, a user must physically move the edge device outside the secure computing network in order to acquire the update files. Such cumbersome requirements result in users refraining from physically moving a given edge device for or moving a group of edge devices to an accessible location for each available update. As a result, edge devices deployed in secure computing networks run outdated or unsafe software, causing edge devices to be inefficient and vulnerable to attacks.

These challenges and others can be addressed by the various examples of the present disclosure that, in some examples, provide for techniques to update an edge device deployed in a secure computing environment. Build contents, configured to update software installed on the edge device, are generated and stored in a repository connected to a public network. The public network is inaccessible to devices within the secure computing environment, including the edge device. A second device, such as a mobile device connected to the public network, acquires the build contents in the form of a signed lockbox file. An edge device management service generates a lockbox file containing the build contents and a trusted signer within the public network signs the lockbox file. The second device connects to the secure computing network and establishes communications with the edge device. The edge device verifies the signed lockbox file provided by the second device. Upon verification, the edge device determines whether the update is a more recent software version than a software version currently installed on the edge device. Upon determining that the update is a more recent software version, the edge device extracts the contents of the signed lockbox file to update the software installed on the edge device.

At least one technological advantage of the disclosed techniques relative to prior techniques is that an edge device can acquire, verify, and install software updates using build contents that would otherwise be inaccessible to the edge device deployed within the secure computing environment. Such techniques enable a user to provide updates to one or more edge devices deployed within a secure computing environment without requiring physical movement of each edge device to a location where the edge device can access a public network to initiate an update process. Further, such techniques enable edge devices to update operations while complying with restrictive security and compliance limitations, expanding the number of environments that such edge devices can be implemented.

Figure 8:
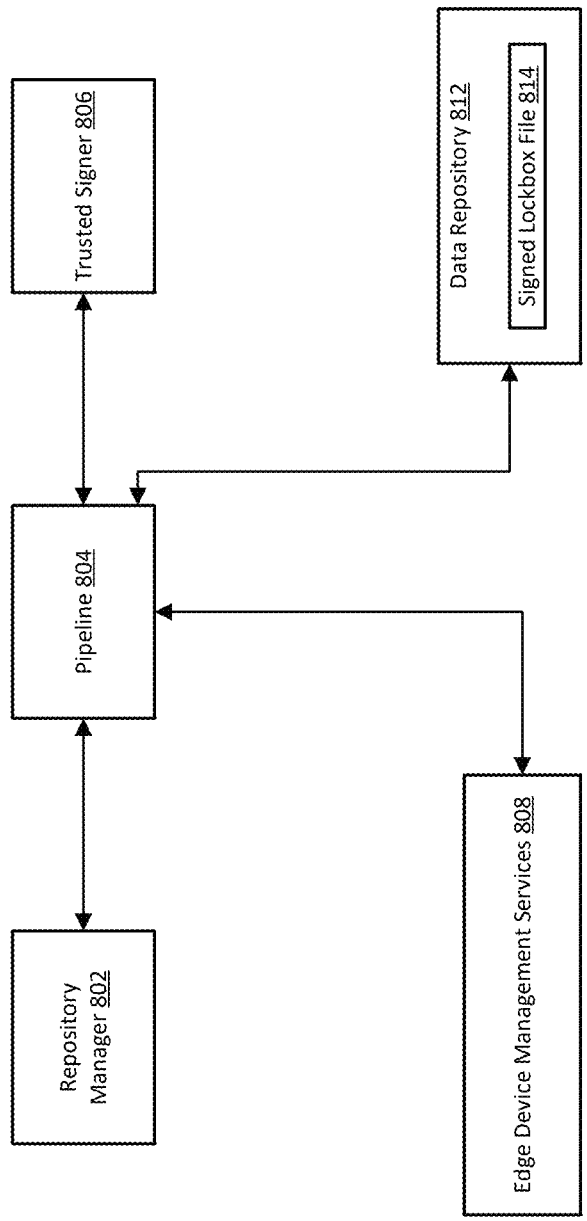
FIG. 8 illustrates an example operation of a repository manager generating a signed lockbox file for updating an edge device, in accordance with example implementations.

FIG. 8 illustrates an example operation of a repository manager 802 generating a signed lockbox file 814 for updating an edge device, in accordance with example implementations. As shown, and without limitation, the network 800 includes a repository manager 802, a pipeline 804, a trusted signer 806, edge device management services 808, a data repository 812, and a signed lockbox file 814.

In operation, the repository manager 802 prepares a set of update files associated with updating software installed on an edge device (e.g., edge devices 150, 250, 350, 450, 550, 650). For example, the repository manager 802 can compile a set of update files (e.g., build contents) into an image that enables the edge device to perform file system updates atomically. The repository manager 802 transmits the set of update files via the pipeline 804 to the edge device management services 808, where the edge device management services 808 generate a lockbox file containing the set of update files. The edge device management services 808 transmit the lockbox file via the pipeline 804 to the trusted signer 806. The trusted signer 806 signs the lockbox file to generate the signed lockbox file 814. The trusted signer 806 transmits the signed lockbox file 814 to the data repository 812 via the pipeline 804, where the data repository 812 stores the signed lockbox file 814 for subsequent acquisition by devices in the network 800.

The repository manager 802 is an artifact manager that houses and manages various files, such as binaries, packages, file groups, containers, and/or other components. In various implementations, the repository manager 802 is included (e.g., operates, executes, resides) in a first network and establishes communications with other components via the pipeline 804. In various implementations, the repository manager 802 generates packages of build contents, including binaries and dependencies, and manages which packages are stored in the data repository 812. For example, the repository manager 802 can manage which signed lockbox files 814 are stored in the data repository 812 for retrieval, replacing signed lockbox files associated with previous updates with the signed lockbox file 814 associated with the most recent update.

In various implementations, the repository manager 802 manages the creation of the signed lockbox file 814 to enable secure offline updates of edge devices within a secure computing environment (e.g., a given edge device is not able to access the set of update files stored in the public network 800). In some implementations, the signed lockbox file 814 is a collection of binary files, installation instructions, and/or software repository metadata. For example, the lockbox file can contain an image of file system software that modifies the operating system software installed on a given edge device, along with various dependencies (e.g., drivers, libraries, and settings) used during installation. In such instances, the repository manager 802 acts as a build server that compiles the image of the file system software.

The pipeline 804 is a set of devices and/or software components that coordinate the generation and storage of the signed lockbox file 814. In various implementations, the pipeline 804 is a continuous integration and continuous deployment (CI/CD) pipeline that includes components that execute a series of steps to deliver a new version of software. For example, the pipeline 804 coordinates the generation of the image of the file system software update by receiving build contents from the repository manager 802 and transmitting the build contents to the edge device management services 808. In such instances, the edge device management services 808 generate a lockbox file containing the build contents and transmit the lockbox file to the pipeline 804.

The edge device management services 808 are services that manage one or more edge devices. In various implementations, the edge device management services 808 includes a sensor backend system that includes various services (e.g., registration services, sensor control services, service provisioning, reporting service, etc.) associated with the deployment and operation of edge devices. In some implementations, the edge device management services 808 manage updates of edge devices by generating lockbox files containing content that enables an edge device to update software when offline. In some implementations, the edge device management services 808 verifies credentials provided by the pipeline 804 before generating the lockbox file containing the provided build contents.

The trusted signer 806 is a user, device, or service that signs the lockbox file to generate the signed lockbox file 814. In various implementations, the trusted signer 806 can be a cloud signing service that receives the lockbox file via the pipeline 804 and signs the lockbox file. In such instances, the trusted signer 806 can use various techniques, such as signing the lockbox file with a private key in a public/private key pair, to generate the signed lockbox file 814. Upon the trusted signer 806 generating the signed lockbox file 814, the repository manager 802 downloads the signed lockbox file 814 via the pipeline 804 and causes the signed lockbox file 814 to be stored in the data repository 812.

The data repository 812 is a device or service that stores the signed lockbox file 814. In various implementations, the data repository 812 is a cloud storage service that provides object storage for various types of content items. In such instances, various types of devices can acquire the signed lockbox file 814 from the data repository 812.

An example of usage of the network 800 of FIG. 8 is as follows. In general, a "merge request" can be merged into a target branch of the network 800 environment (e.g., develop, staging, or production), which can trigger the start of a pipeline process to build an image of an update for one or more edge devices. The image contents can be compressed to a file and uploaded to the repository manager 802. In some cases, a development team, or other entity can download the compressed file from the repository manager 802, such as where an edge device needs to be re-flashed. The build contents can be uploaded to the edge device management services 808. For example, a command line tool can use an API compatible with the edge device management services 808, along with a temporary access token retrieved via the pipeline 804.

Once the build contents are uploaded, a request can be issued to the edge device management services 808 for creation of a lockbox file, and the pipeline 804 can monitor the progress of the lockbox file generation until complete. Once complete, the lockbox file can be downloaded within the pipeline 804 and uploaded to the repository manager 802. The trusted signer 806 can be provided with a logical address (e.g., a URL) for the lockbox file, and the trusted signer 806 can use the logical address to request the lockbox file to be digitally signed. The trusted signer 806 can digitally sign the lockbox file to generate the signed lockbox file 814, and can upload the signed lockbox file 814 back to the repository manager 802. The signed lockbox file 814 can be downloaded by the pipeline 804 (e.g., for storage to the data repository 812.

The process of generating the signed lockbox file 814 can be repeated (e.g., serially, in parallel, etc.) for all edge devices that are concurrently supported. For example, multiple signed lockbox files 814 can be generated for different versions of a System-on-Module that are deployed in the field. A manifest file can also be generated to keep track of update builds. For example, the manifest file can have a base structure that describes a version and a filename update corresponding to each version of the build contents that correspond to a signed lockbox file 814. Embodiments can create (or update) a public website to make the manifest and update files available for public consumption. In some implementations, the public website is created using a skinny app template. In some implementations, the public website is created for a particular environment in which to make the manifest and update files available. For example, the environment can be a "playground" environment, a "staging" environment, or a "default" environment. In such an example, the playground environment may use a cloud-based playground cluster of resources in the data repository 812 accessible only via a virtual private network (VPN), the staging environment may use a cloud-based staging cluster of resources in the data repository 812 accessible only via a VPN, and the default environment may use a cloud-based production cluster of resources in the data repository 812 accessible by any user on the internet. The skinny app can make use of standard or custom templates to create any suitable components, such as a storage container, logs, a certificate manager, role resources, etc. In some implementations, the pipeline 804 is granted access to the storage container from the skinny app (e.g., using a setup performed via a vault role generator). Before uploading the latest versions of manifest and update files, all current contents of the storage container can be deleted so that the storage container only keeps the latest manifest and update files.

Once a new update build is uploaded to the storage container from the skinny app, different approaches can be used to update the edge device(s). One category of such approaches is referred to herein as "offline updating," and another category of such approaches is referred to herein as "online updating."

Figure 9:
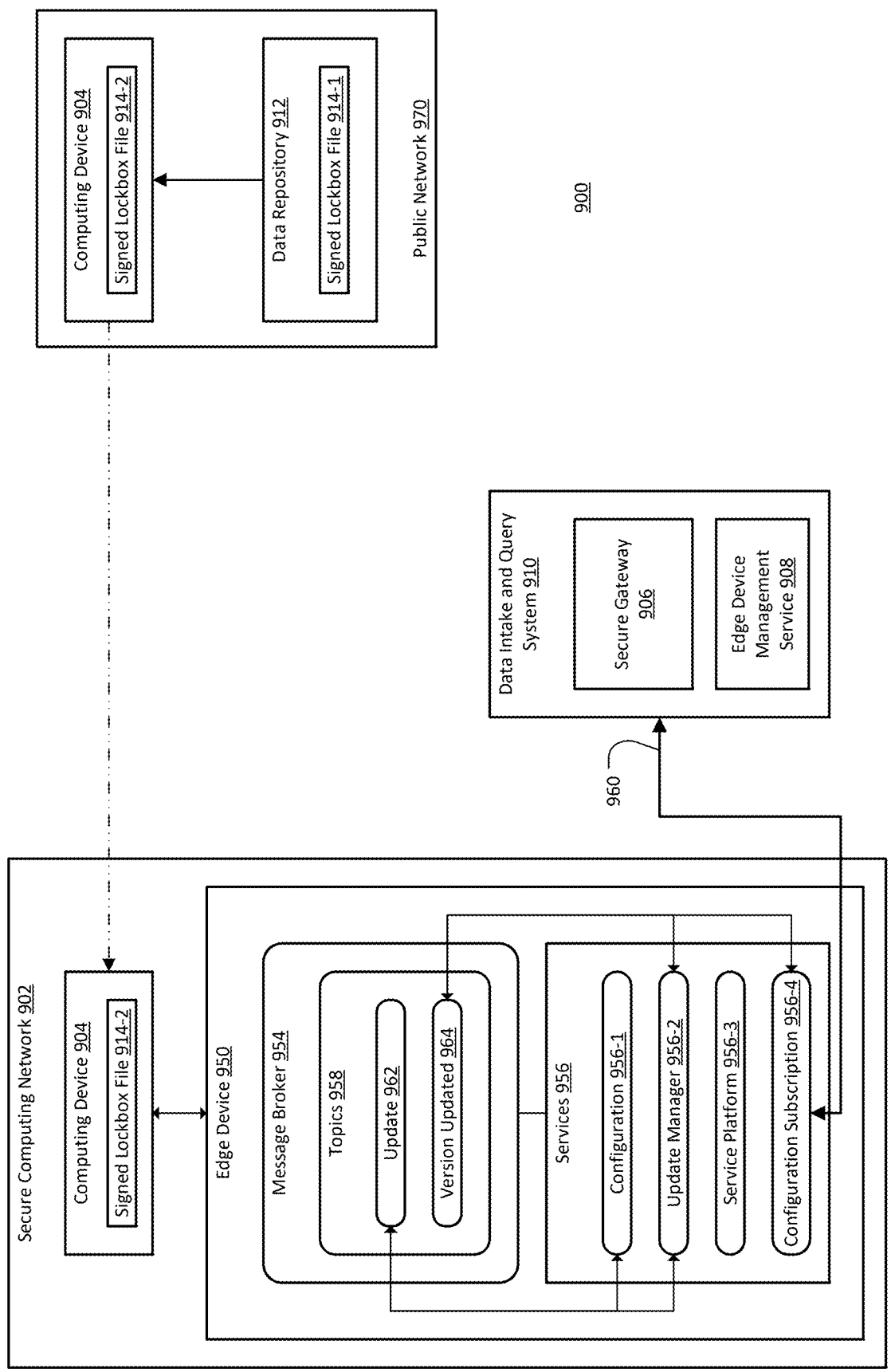
FIG. 9 illustrates an example operation of an edge device operating in a secure computing environment updating software installed in the edge device, in accordance with example implementations.

Turning first to offline updating, these approaches generally refer to cases where users manually download the signed lockbox file 814 directly from the public website (e.g. from the storage container) to initiate an update of an edge device. For example, users can be notified that an update is available, or users may check periodically to determine whether updates are available. Offline updating can be used in several contexts. One such context is where both the edge device and a dedicated app used (by users) to interface with the edge device are restricted by network policies to access the website with new releases. Another such context is where the dedicated app can reach the website to check for new versions and can notify the edge device(s) that there is a new version, but the edge devices(s) are nonetheless restricted by network policies to reach the website. In such a case, any attempt to perform an update (either using a user interface at the edge device itself or via the dedicated app) will result in an error at the edge device(s) and will be aborted. In these and/or other similar contexts, offline approaches can be used to update the edge device(s), such as described in FIGS. 9 and 10. FIG. 9 illustrates an example operation of an edge device operating in a secure computing environment updating software installed in the edge device, in accordance with example offline updating implementations. As shown, and without limitation, system 900 includes, without limitation, a secure computing network 902 and a public network 970. The secure computing network 902 includes, without limitation, a computing device 904, and an edge device 950. The computing device 904 includes, without limitation, a signed lockbox file 914. As described below, the system 900 also includes a data intake and query system 910 that can be part of the secure computing network 902, the public network 970, or some other environment. The edge device 950 includes, without limitation, a message broker 954 including topics 958 (e.g., an update topic 962 and a version updated topic 964) and services 956 (e.g., a configuration service 956-1, an update manager 956-2, a service platform 956-3, and a configuration subscription service 956-4). The data intake and query system 910 includes, without limitation, a secure gateway 906 and an edge device management service 908. The public network 970 includes, without limitation, the computing device 904 and the data repository 912. The data repository 912 includes, without limitation, the signed lockbox file 914.

In operation, the computing device 904 facilitates the offline update of the edge device 950 using the signed lockbox file 914. When the computing device 904 is within the public network 970, the computing device 904 downloads a copy of the signed lockbox file 914-1 stored in the data repository 912. Upon storing the copy as the signed lockbox file 914-2, the computing device 904 moves into the secure computing network 902 to initiate the update process for the edge device 950. When the computing device 904 is within the secure computing network 902, the edge device 950 acquires the signed lockbox file 914-2 and verifies the signature of the signed lockbox file 914-2. The edge device 950 uses the signed lockbox file 914-2 to update the applicable software. Upon updating the applicable software, the edge device 950 publishes a notification of the software update via a trusted tunnel bridge 960 to the data intake and query system 910.

In various implementations, the signed lockbox file 914-1 includes build contents to update software installed on the edge device 950. Such build contents can include content items that enable new features, security upgrades, kernel patches, and/or improve overall experience and performance of the edge device 950. In various implementations, when the edge device 950 is within the secure computing network 902, various security and/or compliance requirements restrict access to the public network 970 or make the public network 970 wholly inaccessible. In such instances, the edge device 950 is unable to acquire the signed lockbox file 914-1 from the data repository 912.

The secure computing network 902 substantially restricts or prevents devices within the secure computing network 902 from communicating with devices outside of the secure computing network. For example, the computing device 904 and data repository 912 included in the public network 970 are inaccessible to the edge device 950 and the data intake and query system 910 within the secure computing network 902. For example, the secure computing network 902 can be an air-gapped network that prevents wireless communications with devices outside of the secure computing network 902. In some implementations, the secure computing network 902 can satisfy various security policies that specify rules for computer network access and/or comply with various security protocols imposed within the secure computing network. For example, the secure computing network can impose a security policy that includes one or more electronic security requirements (e.g., limiting inbound/outbound electronic access between devices outside the secure computing network 902 and devices within the secure computing network 902, authentication of connectivity, etc.)

and one or more physical security requirements (e.g., entities are to control physical access to devices within the secure computing network 902).

The computing device 904 is a device that can move between the public network 970 and the secure computing network 902. For example, when the secure computing network 902 is an air gapped network, the computing device 904 can be a mobile device that physically moves from a first location where the public network 970 is accessible to a second location where the secure computing network 902 is accessible and the public network 970 is inaccessible. Alternatively or additionally, the computing device 904 can switch connections between networks 902, 970. For example, the computing device 904 can first connect to the public network 970, then change connectivity to connect to the secure computing network 902.

When the computing device 904 is connected to the public network 970, the computing device 904 acquires a copy of the signed lockbox file 914-1 (e.g., the signed lockbox file 914-2) for use by the edge device 950 to perform a software update while the edge device 950 is within the secure computing network 902. In some implementations, the computing device 904 provides credentials associated with the signed lockbox file 914-1 to the data repository 912 before the data repository 912 transmits a copy of the signed lockbox file 914-2.

When computing device 904 is connected to the secure computing network 902, the computing device 904 provides the signed lockbox file 914-2 to the edge device 950. In some implementations, a user manually starts the configuration service 956-1 on the edge device 950 to download the signed lockbox file 914-2. In such instances, the configuration service 956-1 can display a graphical user interface at the edge device 950 to respond to manual inputs provided by the user to download, verify, and use the signed lockbox file 914-2 to update the edge device 950. In some implementations, the configuration service 956-1 causes the edge device 950 to establish a direct connection between the computing device 904 and the edge device 950 (e.g., a connection via port 8000). Alternatively or additionally, in some implementations, the computing device 904 uploads the signed lockbox file 914-2 to the configuration service 956-1 operating on the edge device 950. In such instances, the edge device 950 can verify a set of credentials provided by the computing device 904 prior to downloading the signed lockbox file 914-2. In various implementations, when the configuration service 956-1 downloads the signed lockbox file 914-2, the configuration service 956-1 also publishes a message (e.g., message 570) to the update topic 962.

In various implementations, the update manager 956-2 is a subscriber to the update topic 962. When the configuration service 956-1 publishes a message to the update topic 962, the update manager 956-2 processes the message in the update topic 962 and responds to the message by processing the signed lockbox file 914-1. Processing the signed lockbox file 914-2 includes verifying the signed lockbox file 914-2. For example, if the trusted signer 806 generated the signed lockbox file 914 using a private key in a private-public key pair, the update manager 956-2 can use the public key of the key pair to verify the signature of the signed lockbox file 914-2. Upon verifying the signed lockbox file 914-2, the update manager 956-2 locally stores the signed lockbox file 914-2 and/or contents of the signed lockbox file 914-2.

In some implementations, the update manager 956-2 extracts the contents of the signed lockbox file 914-2. In such instances, the extracted contents of the signed lockbox file 914-2 includes build contents (e.g., image of the software update, associated dependencies, etc.) and metadata associated with a specific version of the software. For example, the signed lockbox file 914-2 can includes an internal manifest file that acts as a trusted source of version information. The edge device 950 uses the manifest file for version comparison against the version installed on the edge device 950 when determining whether to update the software using the build contents. For example, the update manager 956-2 can compare the version installed on the edge device 950 against the version specified in the manifest file to determine whether the build contents correspond to a newer software version. When the update manager 956-2 determines that the build contents correspond to a newer software version, the update manage 956-2 causes the build contents to be mounted within the service platform 956-3.

In various implementations, the service platform 956-3 updates applicable software operating on the edge device 950 using the build contents included in the signed lockbox file 914-2. For example, the service platform 956-3 can include a pre-defined location within the system memory 680 that serves as a mount point for installation. For example, the update manager 956-2 can cause the build contents to be mounted at the pre-defined location and restart the edge device 950. During the restart process, the service platform 956-3 processes the build contents at the mount point, causing the service platform 956-3 to update the software operating on the edge device 950. For example, when the build contents are an image for file system software, the service platform 956-3 uses the mounted image to update the file system software operating on the edge device 950.

In various implementations, the update manager 956-3 monitors the update process being performed by the service platform 956-3. In such instances, the update manager 956-3 publishes messages to cause the UI screen of the edge device 950 to provide notifications regarding the update process. When the service platform 956-3 completes the installation, the update manager 956-3 determines that installation is complete and publishes a message to the version updated topic 964.

In various implementations, the configuration subscription service 956-4 is a subscriber to the version updated topic 964 and processes the message published by the update manager 956-2. In such instances, the configuration subscription service 956-4 transmits a message to the data intake and query system 910 confirming that the edge device 950 has successfully updated the software with the new software version. In some implementations, the configuration subscription service 956-4 establishes a trusted tunnel bridge 960 as a communication channel between the edge device 950 and the data intake and query system 910 to transmit the notification message.

In various implementations, the edge device 950 uses the trusted tunnel bridge 960 to communicate with the data intake and query system 910 for other processes. For example, the edge device 950 can specify a specific operating ("hub") state, such as a shutdown state, an update state, a sensing state etc. In such instances, the edge device 950 can periodically transmit a pulse request message containing the requested hub state to the data intake and query system 910. In such instances, the data intake and query system 910 responds to the pulse request message by changing the hub state to the requested hub state.

In some implementations, the data intake and query system 910 can register the edge device with the computing device 904, account, and/or a specific user. For example, a user can maintain an account that includes a set of two or more edge devices 950. In such instances, the data intake and query system 910 can remotely set one or more operational settings for each edge device 950 registered to the account. For example, the user can modify a service configuration detail (e.g., a data ingestion configuration, anomaly detection algorithm or threshold, etc.) for a first edge device 950-1. Upon the first edge device 950-1 providing a notification to the data intake and query system 910, the edge device management service 908 in the data intake and query system 910 can transmit corresponding updates to one or more other edge devices (e.g., 950-2, 950-3, etc.) registered to the same account.

In various implementations, the edge device 950 can communicate with one or more target devices using a version of a simple network management protocol (SNMP). In such instances, edge device 950 can monitor the one or more target devices based on polling data sent by the one or more target devices to the edge device 950. In some implementations, a user can specify the Internet Protocol (IP) address of a given target device that is to be monitored. In some implementations, the user can also specify a specific SNMP protocol version and/or a management information base (MIB) file that supports the target device. In some implementations, the edge device 950 receives a selection of items to be monitored. Upon receiving the selection, the edge device 950 can periodically poll (e.g., every five minutes) the one or more target devices to retrieve information associated with the selected items. Upon receiving the information from the target devices, the edge device 950 can generate data that the data intake and query system 910 ingests as a series of events.

In some embodiments, the data intake and query system 910 is an on-premises data intake and query system 910. For example, the data intake and query system 910 can reside in the secure computing environment 902. In some such embodiments, the data intake and query system 910 communicates with one or more edge devices 950 via a trusted tunnel bridge 960, such as a trusted bridge network. In other embodiments, the data intake and query system 910 is an off-premises data intake and query system 910, such as a cloud-based data intake and query system 910. For example, the data intake and query system 910 is implemented in the cloud, otherwise in the public network 970, or in another private network separate from the secure computing network 902. In a hybrid architecture, one or more components of data intake and query system 910 are implemented in the cloud (public network 970), while other components reside in the secure computing environment 902. In such off-premises and hybrid embodiments, the data intake and query system 910 communicates with one or more edge devices 950 via a trusted tunnel bridge 960, such as a trusted bridge network. For example, although the cloud-based data intake and query system 910 and the data repository 912 are both in the public network 970, the cloud-based data intake and query system 910 may not have direct access to the data repository 912. Rather, as described above, the configuration subscription service 956-4 can be a subscriber to the version updated topic 964 and can process the message published by the update manager 956-2, after which the configuration subscription service 956-4 can transmit a message via the trusted tunnel bridge 960 to the cloud-based data intake and query system 910 confirming that the edge device 950 has successfully updated the software with the new software version.

Figure 10:
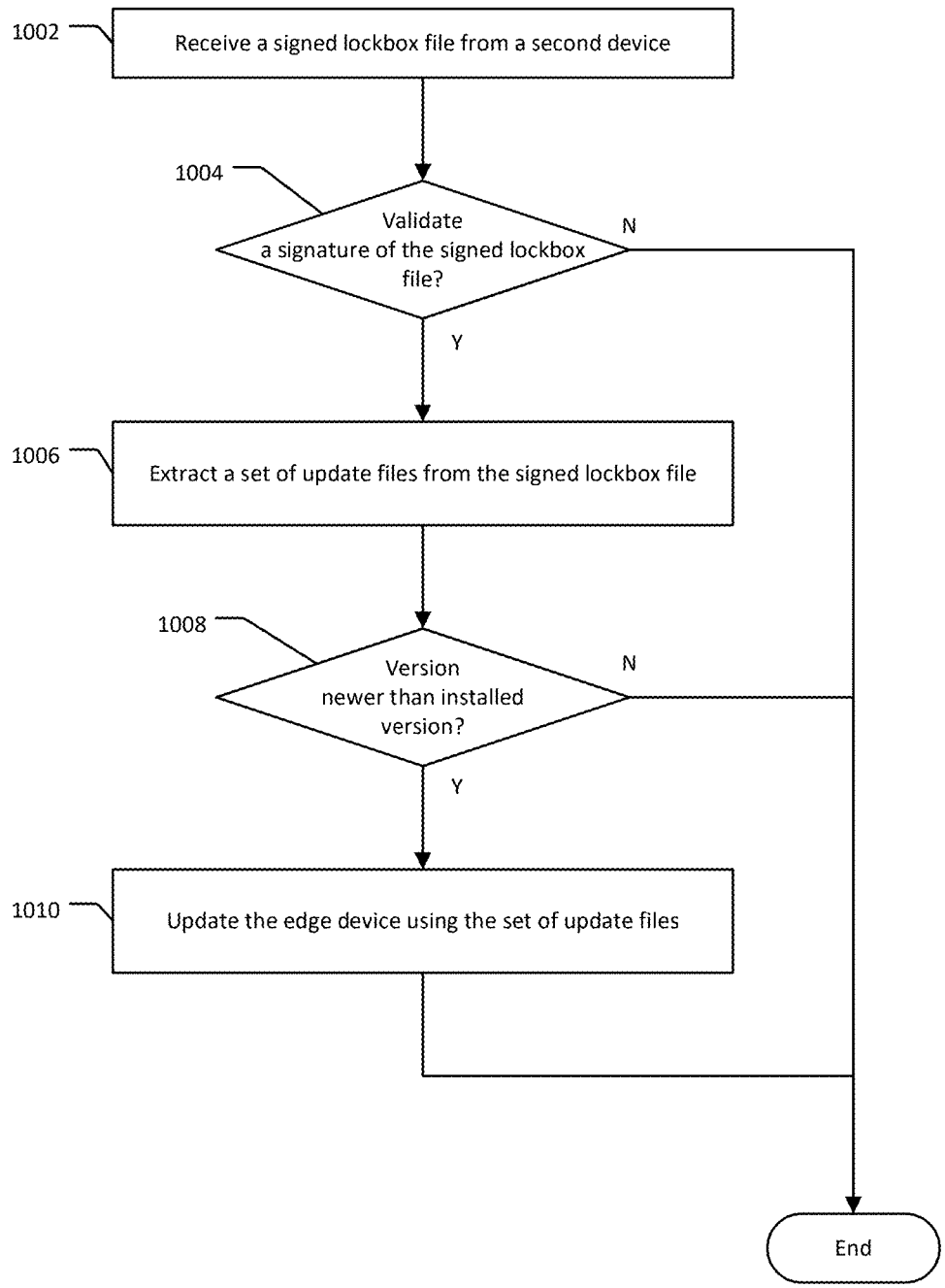
FIG. 10 illustrates a flowchart of an example process for updating software installed in an edge device operating in a secure computing environment, in accordance with example implementations.

FIG. 10 illustrates a flowchart of an example process for updating software installed in an edge device operating in a secure computing environment, in accordance with example implementations. Although the method steps are described in conjunction with FIGS. 1-9, persons of ordinary skill in the art will understand that any system configured to perform this method and/or other methods described herein, in any order, and in any combination not logically contradicted, is within the scope of the present invention.

The example process 1000 can be implemented, for example, by a computing device that comprises a processor and a non-transitory computer-readable medium. The non-transitory computer readable medium can be storing instructions that, when executed by the processor, can cause the processor to perform the operations of the illustrated process 1000. Alternatively or additionally, the process 1000 can be implemented using a non-transitory computer-readable medium storing instructions that, when executed by one or more processors, cause the one or more processors to perform the operations of the process 1000 of FIG. 1.

As shown by method 1000, at step 1002, where the edge device 950 receives a signed lockbox file 914 from a second device. In various implementations, a configuration service 956-1 operating on the edge device 950 receives a copy of a signed lockbox file 914-2 from a second device, such as the computing device 904 connected to the secure computing network 902. In some implementations, the configuration service 956-1 causes the edge device 950 to establish a direct connection between the computing device 904 and the edge device 950 (e.g., a connection via port 8000). Alternatively or additionally, in some implementations, the computing device 904 uploads the signed lockbox file 914-2 to the configuration service 956-1 operating on the edge device 950. In such instances, the edge device 950 can verify a set of credentials provided by the computing device 904 prior to downloading the signed lockbox file 914-2.

In some implementations, the computing device 904 downloads the signed lockbox file 914 from the data repository 912 by accessing the public network 970. In various implementations, the signed lockbox file 914-1 includes build contents to update software installed on the edge device 950. Such build contents can include content items that enable new features, security upgrades, kernel patches, and/or improve overall experience and performance of the edge device 950. In some implementations, the computing device 904 physically moves from a location where the public network 970 is accessible to a different location within the secure computing network 902 where the public network 970 is not accessible to the computing device 904.

At step 1004, the edge device 950 determines whether to validate a signature of the signed lockbox file 914. In various implementations, an update manager 956-2 operating on the edge device 950 processes the signed lockbox file 914 by verifying the signature of the signed lockbox file 914. For example, the update manager 956-2 can use a public key of a key pair to determine whether a trusted signer 806 validly signed the signed lockbox file 914 with the corresponding private key of the key pair. When the update manager 956-2 successfully validates the signature of the signed lockbox file 914, the edge device 950 proceeds to step 1006; otherwise, the update manager 956-2 determines that the signed lockbox file 914 cannot be validated and ends the method 1000.

At step 1006, the edge device 950 extracts a set of update files from the signed lockbox file 914. In various implementations, the update manager 956-2 extracts build contents and associated dependencies from the signed lockbox file 914. For example, the signed lockbox file 914 can contain an image of file system software, an internal manifest file, and associated dependencies.

At step 1008, the edge device 950 determines whether the set of update files are for a newer version of the software than the version of the software installed on the edge device 950. In various implementations, the update manager 956-2 compares versions of the software to determine whether to update the software. For example, the manifest file included in the signed lockbox file 914 can include version information corresponding to the build contents. In such instances, the update manager 956-2 compares the version associated with the build contents to the version of the software installed on the edge device 950. When the update manager 956-2 determines that the version associated with the build contents is newer than the version installed on the edge device 950, the edge device 950 proceeds to step 1010. Otherwise, the update manager 956-2 determines that the version associated with the build contents is not newer than the version installed on the edge device 950 and ends the method 1000.

At step 1010, the edge device 950 updates the edge device 950 using the set of update files included in the signed lockbox file 914. In various implementations, a service platform 956-3 operating on the edge device 950 updates the software using the build contents included in the signed lockbox file 914. For example, the service platform 956-3 can includes a pre-defined location within the system memory 680 that serves as a mount point for installation. The update manager 956-2 causes the build contents to be mounted at the pre-defined location and restarts the edge device 950 for installation. During the restart process, the service platform 956-3 processes the build contents at the mount point, updating the software operating on the edge device 950.

In some implementations, the update manager 956-3 monitors the update process being performed by the service platform 956-3. In such instances, the update manager 956-3 publishes notifications regarding the update process to a version updated topic 964 maintained by the edge device 950. In such instances, a configuration subscription service 956-4 operating on the edge device 950 is a subscriber to the version updated topic 964 and processes the message published by the update manager 956-2. The configuration subscription service 956-4 transmits a message to a data intake and query system 910 (e.g., either to an on-premises data intake and query system 910 operating in the secure computing network 902, to a cloud-based data intake and query system 910 operating in the public network 970, or to a hybrid data intake and query system 910 operating in both the secure computing network and the public network) confirming that the edge device 950 has successfully updated the software with the new software version. In some implementations, the configuration subscription service 956-4 establishes a trusted tunnel bridge 960 as a communication channel between the edge device 950 and the data intake and query system 910 to transmit the notification message.

Turning to online updating, these approaches generally refer to cases where a scheduled modular input is used automatically to retrieve a list of files available through the public website and automatically to update an edge device when it is determined that a newly available version represents a possible update to the current build version of the edge device. In some implementations, the modular input is activated using a user interface element (e.g., switch) available in a settings section of the dedicated app for interfacing with the edge devices. In some cases, the user interface element is deactivated by default (e.g., online updating is inactive by default and can be activated by a user via the dedicated app). As described above with reference to offline updates, contexts can arise in which network restrictions prevent the edge device and/or dedicated app from reaching the storage container domain (e.g., from accessing the public website). In such contexts, activation of online updates can involve the user performing needful changes to network and/or firewall settings to allow the online updates. Otherwise, the user may be restricted to using offline updates.

As noted above, embodiments of online updating can use a modular update to perform scheduled (e.g., periodic) updates. If a same fixed schedule is used for the modular input for all dedicated apps) in servers configured within a same time zone, all those dedicated apps will attempt to access the public website at the same time. In time zones with a large number of users, this can manifest as an unintentional form of distributed denial of service (DDOS) attack, which can effectively make the updating service unavailable and/or lead to other undesirable network conditions. Thus, some embodiments are designed so that the modular input schedule avoids excessive overlap across users. In one embodiment, the modular input schedule is set and/or confirmed by a back-end system to ensure that there is no (or not excessive) overlap in website access schedules. In another embodiment, the modular input schedule is randomized to reduce the probability of overlap. For example, the modular input schedule is set based on a timestamp of when the user interface control was used to activate online updates.

As described above with reference to FIG. 8, new updates result in new versions of build files being uploaded to a data repository 812 and made publicly available. For example, the new versions and manifests listing those new versions are made available in a storage container associated with a public website. When triggered by the modular input schedule, a list of available versions (and corresponding files) is retrieved from the manifest.

Figure 17:
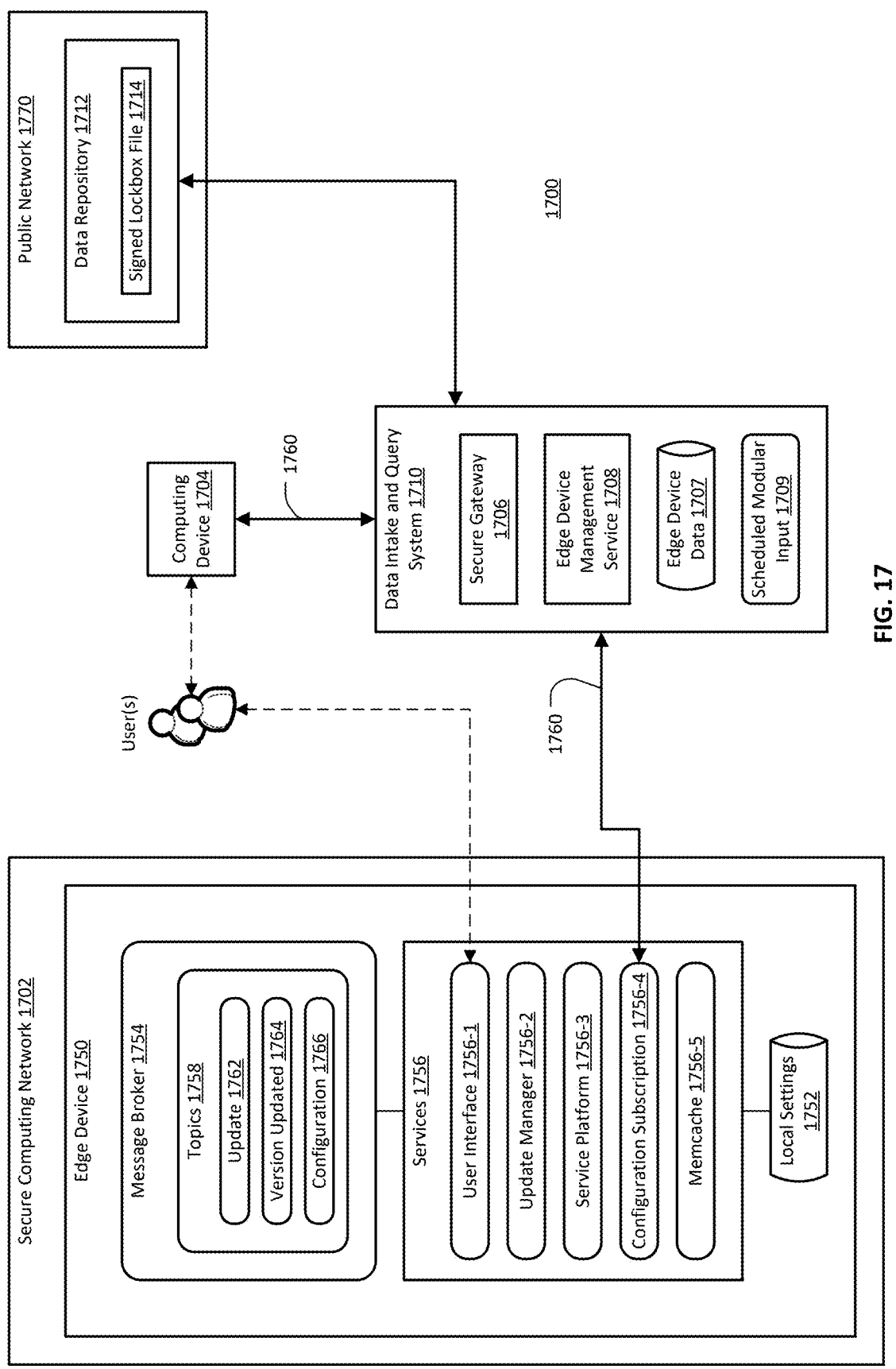
FIG. 17 illustrates an example operation of an edge device operating in a secure computing environment updating software installed in the edge device, in accordance with example online updating implementations.

FIG. 17 illustrates an example operation of an edge device operating in a secure computing environment updating software installed in the edge device, in accordance with example online updating implementations. As shown, system 1700 includes, without limitation, a secure computing network 1702 and a public network 1770. The secure computing network 1702 includes, without limitation, an edge device 1750. As described below, the system 1700 also includes a data intake and query system 1710 that can be part of the secure computing network 1702, the public network 1770, and/or some other environment (i.e., on-premises, cloud-based, or hybrid deployment). The public network 1770 includes, without limitation, a data repository 1712. As described herein, it is assumed that the data repository 1712 has signed lockbox files 1714 including update build files and manifests.

As described herein, the data intake and query system 1710 includes a secure gateway 1706 and an edge device management service 1708. The data intake and query system 1710 (e.g., the edge device management service 1708) also includes a scheduled modular input 1709 that is used to look for edge device updates according to a schedule. For example, the scheduled modular input 1709 can designate certain times in a day (e.g., every day at 00:05, 03:05, 06:05, etc.), a certain periodic update frequency (e.g., every two hours), or any other suitable timing. Further, embodiments of the scheduled modular input 1709 can account for factors, such as network availability, presently available bandwidth, timeframes during which edge devices 1750 are not in use, etc. The scheduled modular input 1709 can trigger the data intake and query system 1710 to access the data repository 1712 to look for latest versions of manifest and build files, such as by accessing one or more storage containers via a public website.

After retrieving latest versions from the data repository 1712, the scheduled modular input 1709 can compare the latest versions against a current version. Embodiments of the data intake and query system 1710 further include an edge device data store 1707 that stores the current version in association with each of one or more edge devices 1750. In such embodiments, the scheduled modular input 1709 can compare the retrieved latest version files with the current version files stored in the edge device data store 1707. The current version documents are replaced with the latest version documents if the current version is identified as lower than the one retrieved (or if the retrieved latest version is identified as higher than the stored current version). In this way, the data intake and query system 1710 does not allow downgrades to the version. For example, an edge device 1750 with a current version of version 1.2.1 can upgrade to 1.2.2 or 1.3.0, but not to 1.2.0. As described herein, the "latest version documents" can be part of one or more signed lockbox file(s) 1714, which can include at least the build contents to update software installed on the edge device 1750, such as content items that enable new features, security upgrades, kernel patches, and/or improve overall experience and performance of the edge device 1750.

In some embodiments, the edge devices 1750 are configured to periodically communicate with the data intake and query system 1710 to retrieve current edge device documents, which may be stored in the edge device data store 1707. For example, the edge device 1750 receives regular status updates relating to sensors, anomaly and upload rate management states, etc. In some implementations, the regular updates can be scheduled at the edge devices 1750 to occur with substantially the same frequency, and/or on substantially the same schedule as configured in the scheduled modular input 1709. In other implementations, the updates requested by the edge device 1750 can be more or less frequent, or otherwise on a different schedule, than the schedule configured in the scheduled modular input 1709. Each time the edge device 1750 retrieves its regular updates stored in the edge device data store 1707, the updates can include a message (or any suitable indication) that a new update version is available (a "latest version message"). In other implementations, the edge device 1750 can retrieve the latest version message separately from receiving other updates.

The edge device 1750 includes, without limitation, services 1756 and a message broker 1754 including topics 1758. As illustrated, the topics 1758 can include, without limitation, an update topic 1762, a version updated topic 1764, and a configuration topic 1766. The services 1756 can include, without limitation, a user interface service 1756-1, an update manager 1756-2, a service platform 1756-3, a configuration subscription service 1756-4, and a memory caching (memcache) service 1756-5. In some embodiments, the configuration subscription service 1756-4 is in communication with the data intake and query system 1710 (e.g., via a trusted tunnel, etc.). In such embodiments, the configuration subscription service 1756-4 receives the latest version message from the data intake and query system 1710 (e.g., as part of receiving regular updates).

When the configuration subscription service 1756-4 processes the latest version message received from the data intake and query system 1710, it can compare its current version with the newer version available, and the edge device 1750 (e.g., the configuration subscription service 1756-4) can update the latest version in a local settings data store 1752. The configuration subscription service 1756-4 can also publish the configuration changes to the configuration topic 1766 in the message broker 1754.

The memcache service 1756-5 is subscribed to the configuration topic 1766 and is thereby informed of the published configuration update. In some embodiments, in response to the configuration update, the memcache service 1756-5 can automatically publish an update request to the update topic 1762 in the message broker 1754. This is one manner in which to kick off an update to the configuration of the edge device 1750, as described below. In some implementations, the memcache service 1756-5 is actually two services: a first service is a cache tool service, and a second service includes the logic that subscribes to the configuration topic 1766 to update the configuration information in the first service.

In some embodiments, the user interface service 1756-1 is subscribed to the configuration topic 1766. For example, in response to the published configuration update, a new dialog is displayed in a settings section of a user interface on the edge device 1750 announcing that the new version is available to update the edge device 1750. A user can be prompted to request (commence) the update, such as by interfacing with a touch display, pressing a button, etc. In some implementations, the user interface service 1756-1 includes logic that checks for updates in the memcache service 1756-5 (e.g., in a cache memory). In such implementations, the user interface service 1756-1 may not be subscribed to the configuration topic 1766; rather, it is informed of the update indirectly because of the memcache service's 1756-5 subscription to the configuration topic 1766. In response to the user interacting with the prompt to commence the update, the user interface service 1756-1 can publish an update request to the update topic 1762 in the message broker 1754. This is another manner in which to kick off the update to the configuration of the edge device 1750, as described below.

In some embodiments, a separate computing device 1704 has an application running thereon that interfaces with the data intake and query system 1710. For example, the computing device 1704 is in communication with the data intake and query system 1710 via a trusted tunnel bridge 1760 (e.g., a bridge network). The computing device 1704 can be any suitable device for running the application and communicating with the data intake and query system 1710, such as a laptop computer, a smartphone, a tablet computer, etc. In such embodiments, the computing device 1704 can receive a notification from the data intake and query system 1710 that a configuration update is available. For example, a message is displayed in a user interface on of the application on the computing device 1704 announcing that the new version is available to update the edge device 1750, and a user can be prompted to request (commence) the update, such as by interfacing with a touch display, pressing a button, etc. In response to the user interacting with the prompt to commence the update, the application can direct the data intake and query system 1710 (e.g., send a message to the edge device management service 1708 via the secure gateway 1706) to send an update request to the edge device 1750. The data intake and query system 1710 can then send an update request message to the configuration subscription service 1756-4, which can publish an update request to the update topic 1762 in the message broker 1754. This is another manner in which to kick off the update to the configuration of the edge device 1750, as described below.

The preceding paragraphs describe several manners in which an update request is published to the update topic 1762. The update manager 1756-2 service is subscribed to the update topic 1762 and thereby is informed of the update request. In response to processing the update request, the update manager 1756-2 can download the corresponding signed lockbox file(s) 1714 for the update version from the data repository 1712. For example, as described above, the signed lockbox file(s) 1714 are retrieved from a storage container accessible via a website.

Once the signed lockbox file(s) 1714 are downloaded, embodiments of the edge device 1750 can perform a number of actions to the downloaded signed lockbox file(s) 1714. Embodiments can validate the signed lockbox file(s) 1714. For example, the update manager 1756-2 can determine whether the signed lockbox file(s) 1714 matches a signature of a public key set in the hub. This public key can be the same key made available by the trusted signer 806 of FIG. 8 and incorporated into the edge device 1750 (e.g., as part of initially flashing the edge device 1750 configuration onto the edge device 1750). Once the signature is confirmed, the compressed files can be extracted from the signed lockbox file(s) 1714.

An internal manifest file within the compressed file provides a trusted source for version comparison against the current version installed in the edge device 1750, and uses logic to ensure that only a later version to what is currently installed will be allowed to proceed. This is done to prevent downgrade attacks to take advantage of exploit vectors fixed in future versions of the software. Once the version is confirmed as valid, it can be mounted in a pre-defined location configured in the service platform 1756-3, and the service platform 1756-3 can be restarted. Upon restart, the service platform 1756-3 can retrieve the extracted update files from the pre-defined mount point and can start the update process. The update manager 1756-2 can continue to monitor the update progression steps. In some embodiments, the update manager 1756-2 can publish messages that can be consumed by the user interface service 1756-1 so that the user interface of the edge device 1750 can indicate the update status to a user. In other embodiments, the update manager 1756-2 can publish similar messages for communication (e.g., via the configuration subscription service 1756-4 and the data intake and query system 1710) to the computing device 1704 so that the user interface of the computing device 1704 can indicate the update status to a user.

Once the update process is complete, the configuration subscription service 1756-4 can publish a message to the version updated topic 1764 indicating that the update is complete. The configuration subscription service 1756-4 can be subscribed to the version updated topic 1764, such that the configuration subscription service 1756-4 is informed of the completed update. In response to processing the update complete message, the configuration subscription service 1756-4 can send a corresponding message to the data intake and query system 1710. In some implementations, the data intake and query system 1710 can update its edge device data store 1707 to indicate the updated version information. Some embodiments can further generate messages for consumption by the user interface service 1756-1 and/or by the computing device 1704 to notify users of the completed update.

In some embodiments, the data intake and query system 1710 is an on-premises data intake and query system 1710. For example, the data intake and query system 1710 can reside in the secure computing environment 1702. In some such embodiments, the data intake and query system 1710 communicates with one or more edge devices 1750 via a trusted tunnel bridge 1760, such as a trusted bridge network. In other embodiments, the data intake and query system 1710 is an off-premises data intake and query system 1710, such as a cloud-based data intake and query system 1710. For example, the data intake and query system 1710 is implemented in the cloud, otherwise in the public network 1770, or in another private network separate from the secure computing network 1702. In a hybrid architecture, one or more components of data intake and query system 1710 are implemented in the cloud (public network 1770), while other components reside in the secure computing environment 1702. In such off-premises or hybrid embodiments, the data intake and query system 1710 communicates with one or more edge devices 1750 via a trusted tunnel bridge 1760, such as a trusted bridge network. For example, although the cloud-based data intake and query system 1710-2 and the data repository 812 are both in the public network 1770, the cloud-based data intake and query system 1710 may not have direct access to the data repository 812. Rather, as described above, the configuration subscription service 1756-4 can be a subscriber to the version updated topic 1764 and can process the message published by the update manager 1756-2, after which the configuration subscription service 1756-4 can transmit a message via the trusted tunnel bridge 1760 to the cloud-based data intake and query system 1710 confirming that the edge device 1750 has successfully updated the software with the new software version.

Figure 18:
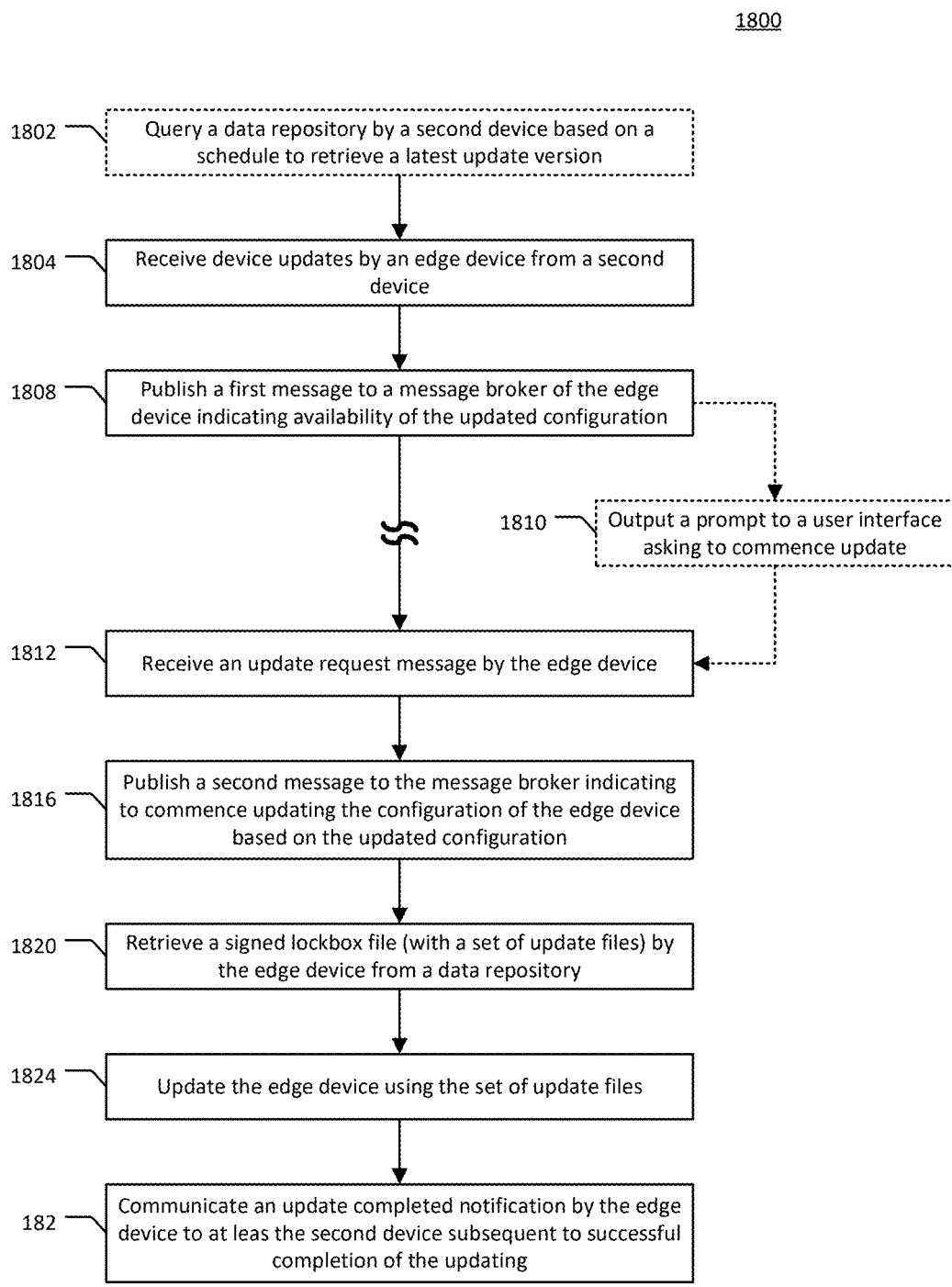
FIG. 18 shows a flow diagram of an illustrative method for online updating of an edge device, according to embodiments described herein.

FIG. 18 shows a flow diagram of an illustrative method 1800 for online updating of an edge device, according to embodiments described herein. Embodiments of the method 1800 can begin at stage 1804 by receiving device updates by an edge device in a secure computing network from a second device. The device updates indicate a latest update version for a configuration of the edge device, the latest update version being an updated configuration relative to a current update version associated with the edge device.

Some embodiments of the method 1800 begin prior to stage 1804, at stage 1802, by querying the data repository, by the second device based on a predetermined schedule, to retrieve the latest update version. Still at stage 1802, embodiments can determine (e.g., by the second device) whether the retrieved latest update version is updated relative to the current update version associated with the edge device and can update the device updates by the second device responsive to determining that the retrieved latest update version is updated relative to the current update version.

At stage 1808, embodiments can publish a first message to a message broker of the edge device indicating availability of the updated configuration based on the receiving. At stage 1812, at some time subsequent to publishing the first message, embodiments can receive an update request message by the edge device. In some embodiments, the update request message is received at stage 1812 from an automated service of the edge device without a user interaction (i.e., the update automatically commences). Other embodiments can further include, at stage 1810, outputting a prompt via a user interface (e.g., of the edge device and/or of a user device, such as a user smartphone, laptop computer, etc.). The prompt is output responsive to publishing the first message, and the prompt asks whether a user desires to commence updating of the configuration of the edge device. Still at stage 1810, embodiments can receive a user interaction with the user interface, responsive to the prompt, indicating a user request for updating of the configuration of the edge device. In such embodiments, the update request message is received (e.g., and generated) at stage 1812 responsive to receiving the user interaction.

At stage 1816, embodiments can publish a second message to the message broker, responsive to the update request message, indicating to commence updating the configuration of the edge device based on the updated configuration. At stage 1820, embodiments can retrieve a signed lockbox file by the edge device from a data repository in second network separate from the secure computing network. As described herein, the signed lockbox file includes a set of (i . . . c, one or more) update files forming the updated configuration.

At stage 1824, embodiments can update the edge device using the set of update files. The updating can include validating the signed lockbox file by the edge device. The updating can also include extracting the set of update files by the edge device from the validated signed lockbox file. In some embodiments, the updating further includes mounting the set of update files for access by an operating system of the edge device and restarting the edge device, such that the operating system starts up with the mounted set of files. At stage 1828, embodiments can communicate an update completed notification by the edge device to the second device subsequent to successful completion of the updating.

Figure 11:
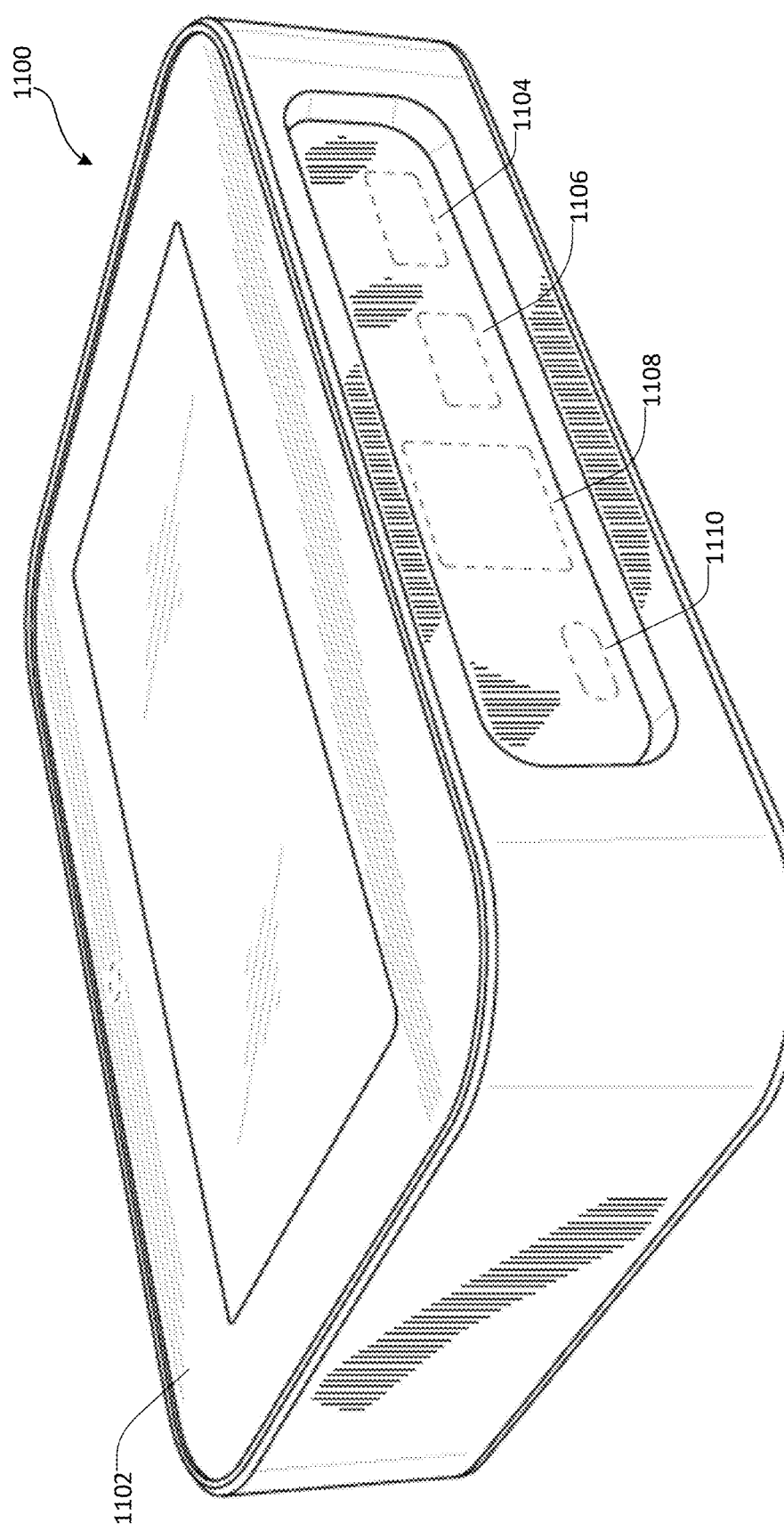
FIG. 11 illustrates a perspective view of an example form factor of an edge device, in accordance with example implementations.

FIG. 11 illustrates a perspective view of an example form factor of an edge device 1100. The edge device 1100 includes a housing 1102 that encases one or more components (e.g., processor 682, storage 684, system memory 680, one or more sensors 652, etc.) of the edge device 1100. In various implementations, the edge device 1100 may include optional ports, including one or more connection port(s) 1104, USB port(s) 1106, networking port(s) 1108, and/or a power connector 1110 along one or more sides of housing 1102.

In some implementations, the connection ports 1104 can include one or more I/O ports that are configured to couple plugged-in devices (e.g., a sensor 652, an input device 622-1, an output device 622-2, etc.) to the I/O devices interface 688. The USB ports 1106 include one or more USB ports that are configured to couple plugged-in devices and/or power sources to the edge device 1100 (e.g., to the I/O devices interface 688) via the USB protocol. The power connector 1110 is configured to couple a power source (e.g., a wall power socket, an external battery) to the edge device 1100 via a wire or cable.

In some implementations, the networking port(s) 1108 are configured to couple the network interface 690 to one or more network(s) 678 via a wire or cable, and any technically feasible protocol (e.g., Ethernet, Wi-Fi adapter, etc.). In various implementations, the edge device 1100 may use the networking port 1108 to attach to other networking ports, such as a switched port analyzer (SPAN) port of another network device, where the SPAN port takes a mirrored copy of network traffic and transmits the copy to a specific destination. In such instances, the edge device 1100 can measure specific network traffic metrics in order to monitor network characteristics associated with the secure computing network 902. Additionally or alternatively, the edge device 1100 can implement the Message Queue Telemetry Transport (MQTT) protocol, Simple Network Management Protocol (SNMP), and/or other protocols to subscribe to specific message brokers and/or collect data about specific managed devices within a given data processing environment (e.g., secure computing network 902).

In some implementations, the housing 1102 is configured to be compliant with various environmental requirements. For example, the housing 1102 can be configured to be compliant with an ingress protection (IP-) rating of IP-66. A housing 1102 with an IP-66 rating indicates that the edge device 1100 is dust tight (e.g., full protection against dust and other particulates, including a vacuum seal; tested against continuous airflow) and has high protection against moisture (e.g., protection against high-pressure jets of directed water from any angle; limited ingress with no harmful effects). In another example, the housing can be configured to be compliant with an IP-rating of IP-67. A housing 1102 with an IP-67 rating also indicates that the edge device 1100 is dust tight and also indicates that the edge device 1100 has higher moisture protection against higher concentrations of moisture (e.g., protection against full immersion for up to 30 minutes at depths between 15 cm and 1 m; limited ingress permitted with no harmful effects. In some implementations, when the housing 1102 is configured to be IP-66 or IP-67 rated, one or more of ports 1104-1110 can be moved or removed in order to ensure that the housing 1102 remains dust tight and moisture resistant.

Figure 12:
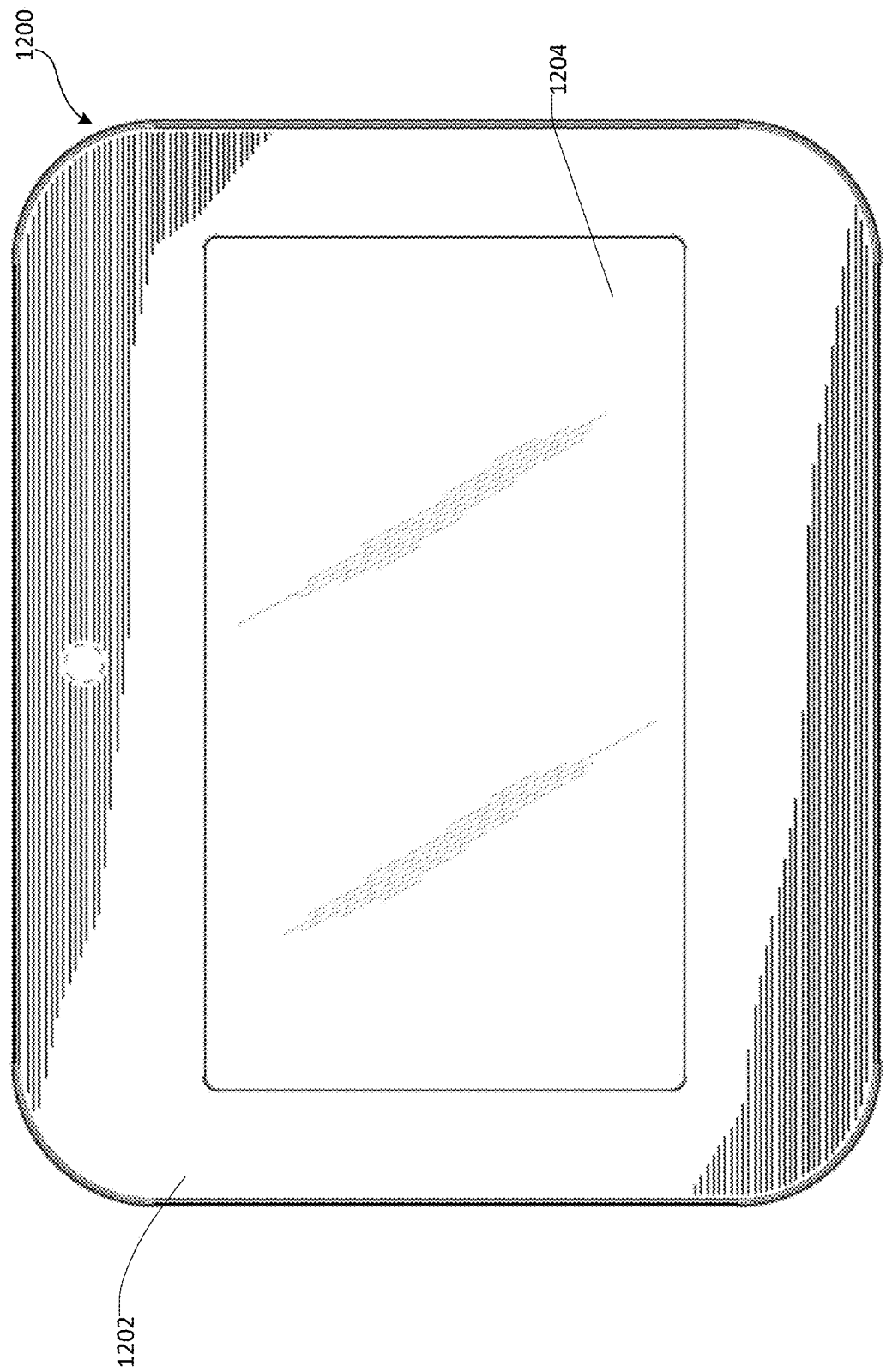
FIG. 12 illustrates a front view of the example form factor of the edge device, in accordance with example implementations.

FIG. 12 illustrates a front view of the example form factor of the edge device 1200, in accordance with example implementations. The edge device 1200 includes a display device 1204 (e.g., an I/O device 622-3) among its output devices 622. The display device 1204 is included in the housing 1202 and is coupled to I/O devices interface 688 of the edge device 1200.

In some implementations, during operation, the edge device 1200 displays various information (e.g., via a user interface) on the display device 1204. For example, the configuration service 956-1 operating on the edge device 1200 causes the display device 1204 to display prompts and notifications associated with updating the edge device 1200.

In some implementations, the edge device 1200 can include multiple sensors (e.g., sensors 652-1, 652-2) installed on a common printed circuit board (PCB). For example, the edge device 1200 can include a temperature sensor, a vibration sensor, a microphone, and an infrared sensor installed on a common printed circuit board. In such instances, the configuration service 956-1 and/or the service platform 956-3 can manage which sensors 652 are active. Additionally or alternatively, the edge device 1200 can include a second PCB that includes the processor. In such instances, the common PCB including the sensors can connect to the second PCB including the processor.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 13:
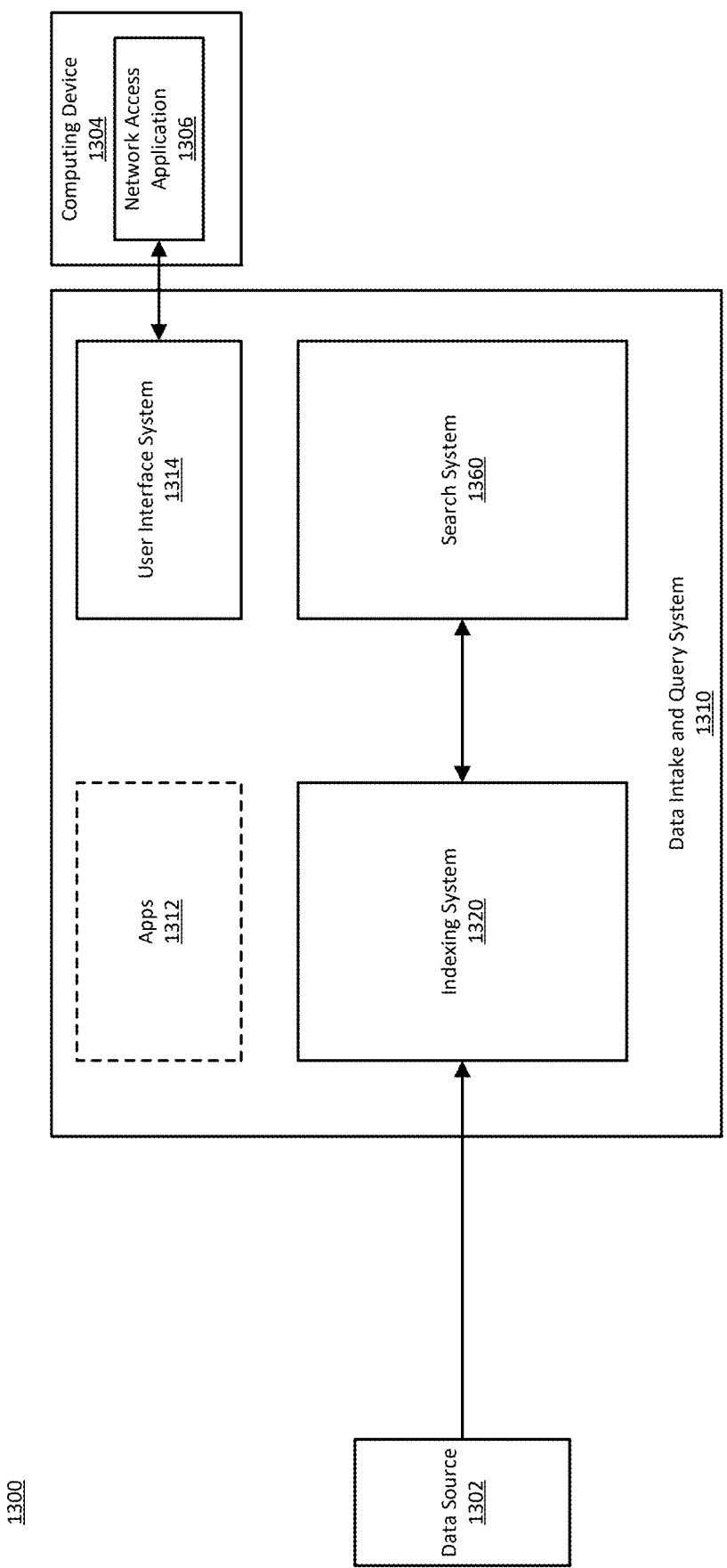
FIG. 13 is a block diagram illustrating an example computing environment that includes a data intake and query system, in accordance with example implementations.

FIG. 13 is a block diagram illustrating an example computing environment 1300 that includes a data intake and query system 1310. The data intake and query system 1310 obtains data from a data source 1302 in the computing environment 1300, and ingests the data using an indexing system 1320. A search system 1360 of the data intake and query system 1310 enables users to navigate the indexed data. Though drawn with separate boxes, in some implementations the indexing system 1320 and the search system 1360 can have overlapping components. A computing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," initiating of searches, and generation of reports, among other operations. The data intake and query system 1310 can further optionally include apps 1312 that extend the search, analytics, and/or visualization capabilities of the data intake and query system 1310.

The data intake and query system 1310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1310 can execute on a single computing device, or may be distributed over multiple computing devices. For example, the program code can include instructions for executing both indexing and search components (which may be part of the indexing system 1320 and/or the search system 1360, respectively), and can be executed on a computing device that also provides the data source 1302. As another example, the program code can execute on one computing device, where the program code executes both indexing and search components, while another copy of the program code executes on a second computing device that provides the data source 1302. As another example, the program code can execute only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine date from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing system 1320. As discussed in greater detail below, the search system 1360 enables users associated with the computing environment 1300 (and possibly also other users) to navigate the data, generate reports, and visualize results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries to the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, which can a network interface of the client computing device 1304 to communicate, over a network, with the user interface system 1314 of the data intake and query system 1310. The user interface system 1314 can use the network access application 1306 to generate user interfaces that enable a user to interact with the data intake and query system 1310. A web browser is one example of a network access application. A shell tool can also be used as a network access application. In some examples, the data intake and query system 1310 is an application executing on the computing device 1304. In such examples, the network access application 1306 can access the user interface system 1314 without needed to go over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

Figure 14:
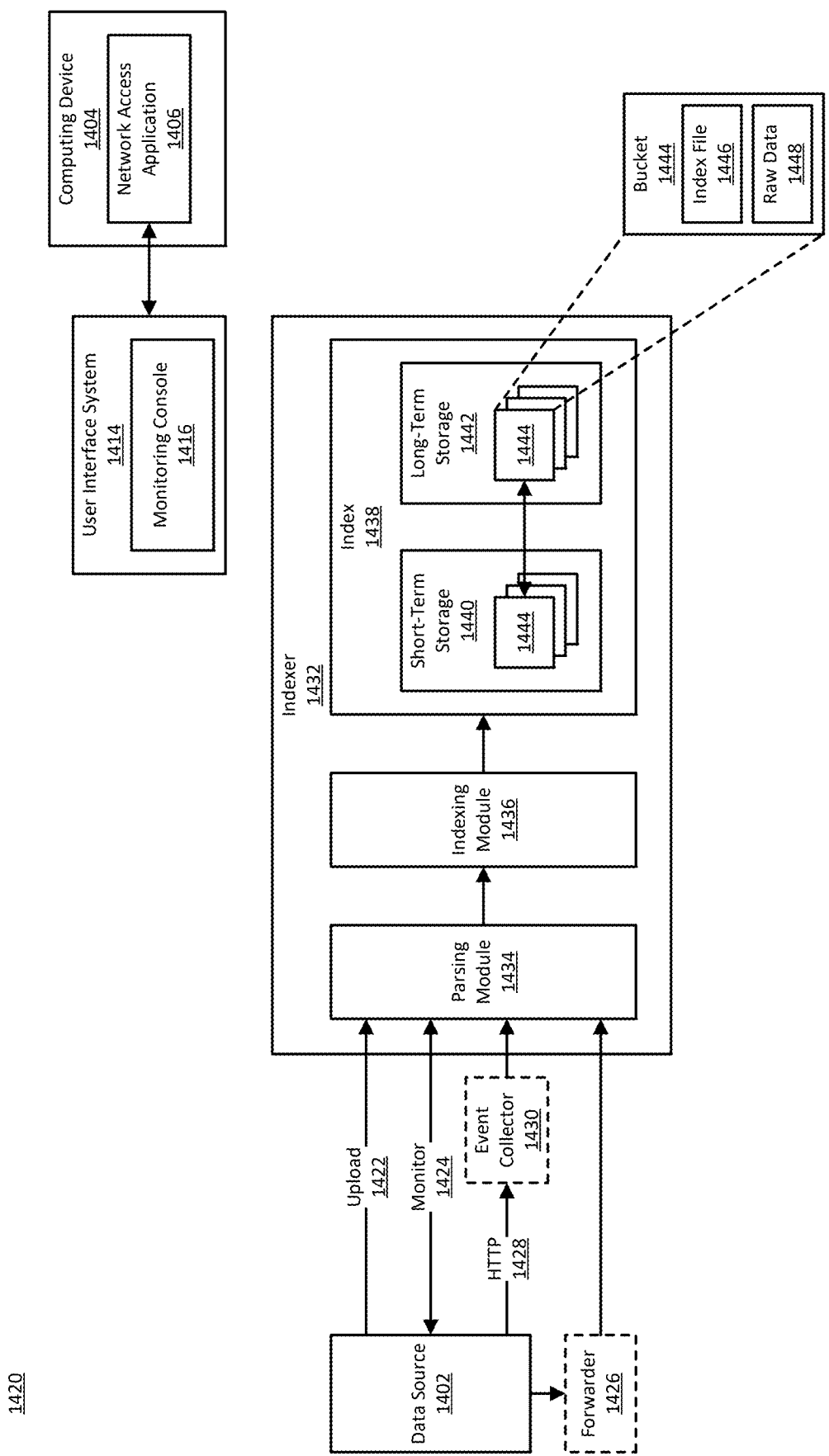
FIG. 14 is a block diagram illustrating in greater detail an example of an indexing system of a data intake and query system, in accordance with example implementations.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for indexing; configuring the indexer 1432 to index the data from the data source 1402; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g. a magnetic, optical, or solid-state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can instruct the indexing system to 1402 to specify a file for uploading into the indexer 1432. For example, the monitoring console 1416 can include commands or an interface through which the user can specify where the file is located (e.g., on which computing device and/or in which directory of a file system) and the name of the file. Once uploading is initiated, the indexer 1432 processes the file, as discussed further below. Uploading is a manual process and occurs when instigated by a user. For automated data ingestion, the other ingestion methods are used.

The monitor 1424 method enables the indexing system 1420 to monitor the data source 1402 and continuously or periodically obtain data produced by the data source 1402 for ingestion by the indexer 1432. For example, using the monitoring console 1416, a user can specify a file or directory for monitoring. In this example, the indexing system 1420 can execute a monitoring process that detects whenever data is added to the file or directory and causes the data to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and .NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1430 extracts events from HTTP 1428 requests and sends the events to the indexer 1432. The event collector 1430 can further be configured to send events or event data to one or more indexers. Extracting the events can include associating any metadata in a request with the event or events included in the request. In these implementations, event generation by the indexer 1432 (discussed further below) is bypassed, and the indexer 1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated to facilitate discussion, with the understanding that implementations with other components are possible to achieve the same functionality.

The parsing module 1434 determines information about event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field or using machine learning.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can extract a set of fields for each event, such as a host or hostname, source or source name, and/or source type. The parsing module 1434 may extract certain fields by default or based on a user configuration. Alternatively or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing component 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can include more than one index and can include indexes of different types. For example, the indexer 1432 can include event indexes, which impose minimal structure on stored data and can accommodate any type of data. As another example, the indexer 1432 can include metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing component 1434 may add fields to event data and/or perform transformations on fields in the event data, and thus a raw data file 1448 can include, in addition to or instead of raw data, what is referred to herein as enriched raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data in the raw data file 1448 with a reference to the location of event data within the raw data file 1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may move from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the index 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

Figure 15:
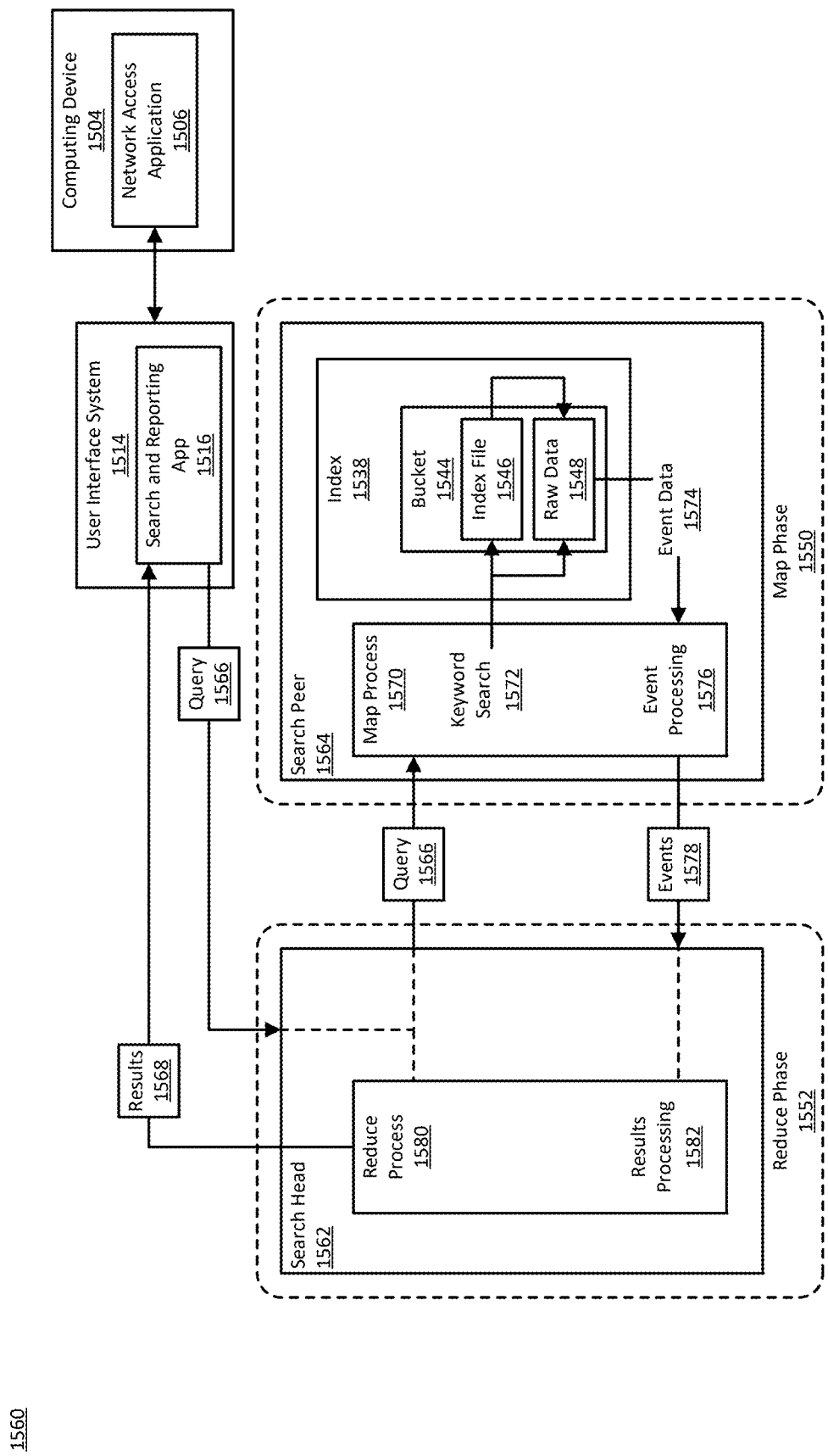
FIG. 15 is a block diagram illustrating in greater detail an example of a search system of a data intake and query system, in accordance with example implementations.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search 1574 using search terms specified in the search query 1566. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data #A74 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the events. The results processing 1582 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

Through results processing 1582, the reduce process 1580 produces the events found by processing the search query 1566, as well as some information about the events, which the search head 1562 outputs to the search and reporting app 1516 as search results 1568. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Chloropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively or additionally, the search and reporting app 1516 can include functionality that enables a user to configure custom dashboards.

The search and reporting app 1516 can also enable further investigation into the events in the search results 1516. The process of further investigation may be referred to as drilldown. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 16:
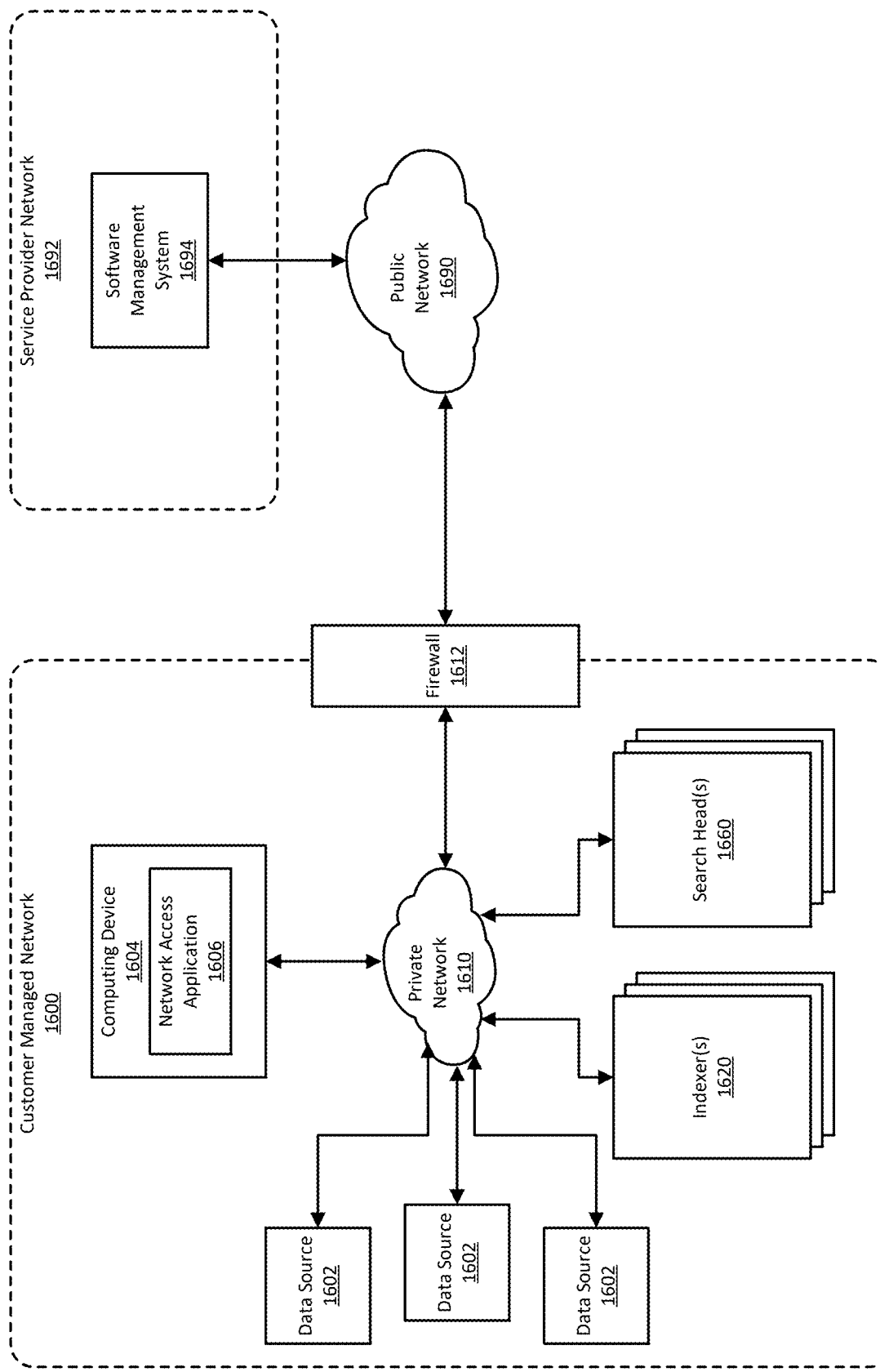
FIG. 16 illustrates an example of a self-managed network that includes a data intake and query system, in accordance with example implementations.

FIG. 16 illustrates an example of a self-managed network 1600 that includes a data intake and query system. "Self-managed" in this instance means that the entity that is operating the self-managed network 1600 configures, administers, maintains, and/or operates the data intake and query system using its own compute resources and people. Further, the self-managed network 1600 of this example is part of the entity's on-premises network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1600 is located within the customer's on-prem environment, such as in the entity's data center, the operation and management of the self-managed network 1600, including of the resources in the self-managed network 1600, is under the control of the entity. For example, administrative personnel of the entity have complete access to and control over the configuration, management, and security of the self-managed network 1600 and its resources.

The self-managed network 1600 can execute one or more instances of the data intake and query system. An instance of the data intake and query system may be executed by one or more computing devices that are part of the self-managed network 1600. A data intake and query system instance can comprise an indexing system and a search system, where the indexing system includes one or more indexers 1620 and the search system includes one or more search heads 1660.

As depicted in FIG. 16, the self-managed network 1600 can include one or more data sources 1602. Data received from these data sources may be processed by an instance of the data intake and query system within self-managed network 1600. The data sources 1602 and the data intake and query system instance can be communicatively coupled to each other via a private network 1610.

Users associated with the entity can interact with and avail themselves of the functions performed by a data intake and query system instance using computing devices. As depicted in FIG. 16, a computing device 1604 can execute a network access application 1606 (e.g., a web browser), that can communicate with the data intake and query system instance and with data sources 1602 via the private network 1610. Using the computing device 1604, a user can perform various operations with respect to the data intake and query system, such as management and administration of the data intake and query system, generation of knowledge objects, and other functions. Results generated from processing performed by the data intake and query system instance may be communicated to the computing device 1604 and output to the user via an output system (e.g., a screen) of the computing device 1604.

The self-managed network 1600 can also be connected to other networks that are outside the entity's on-premises environment/network, such as networks outside the entity's data center. Connectivity to these other external networks is controlled and regulated through one or more layers of security provided by the self-managed network 1600. One or more of these security layers can be implemented using firewalls 1612. The firewalls 1612 form a layer of security around the self-managed network 1600 and regulate the transmission of traffic from the self-managed network 1600 to the other networks and from these other networks to the self-managed network 1600.

Networks external to the self-managed network can include various types of networks including public networks 1690, other private networks, and/or cloud networks provided by one or more cloud service providers. An example of a public network 1690 is the Internet. In the example depicted in FIG. 16, the self-managed network 1600 is connected to a service provider network 1692 provided by a cloud service provider via the public network 1690.

In some implementations, resources provided by a cloud service provider may be used to facilitate the configuration and management of resources within the self-managed network 1600. For example, configuration and management of a data intake and query system instance in the self-managed network 1600 may be facilitated by a software management system 1694 operating in the service provider network 1692. There are various ways in which the software management system 1694 can facilitate the configuration and management of a data intake and query system instance within the self-managed network 1600. As one example, the software management system 1694 may facilitate the download of software including software updates for the data intake and query system. In this example, the software management system 1694 may store information indicative of the versions of the various data intake and query system instances present in the self-managed network 1600. When a software patch or upgrade is available for an instance, the software management system 1694 may inform the self-managed network 1600 of the patch or upgrade. This can be done via messages communicated from the software management system 1694 to the self-managed network 1600.

The software management system 1694 may also provide simplified ways for the patches and/or upgrades to be downloaded and applied to the self-managed network 1600. For example, a message communicated from the software management system 1694 to the self-managed network 1600 regarding a software upgrade may include a Uniform Resource Identifier (URI) that can be used by a system administrator of the self-managed network 1600 to download the upgrade to the self-managed network 1600. In this manner, management resources provided by a cloud service provider using the service provider network 1692 and which are located outside the self-managed network 1600 can be used to facilitate the configuration and management of one or more resources within the entity's on-prem environment. In some implementations, the download of the upgrades and patches may be automated, whereby the software management system 1694 is authorized to, upon determining that a patch is applicable to a data intake and query system instance inside the self-managed network 1600, automatically communicate the upgrade or patch to self-managed network 1600 and cause it to be installed within self-managed network 1600.

1. In various implementations, a method comprises receiving, by an edge device in a secure computing network, a signed lockbox file from a second device, where the second device retrieves the signed lockbox file via a public network that is inaccessible from within the secure computing network, and the edge device receives the signed lockbox file from the second device when the second device is operating within the secure computing network, validating, by the edge device, a signature of the signed lockbox file, extracting a set of update files for the edge device from the signed lockbox file, and updating the edge device using the set of update files.
2. The method of clause 1, where the signed lockbox file is generated by an edge device management service operating in the public network.
3. The method of clause 1 or 2, where the signed lockbox file is signed with a first key by a signing service operating outside the secure computing network, and the edge device validates the signature using a second key corresponding to the first key.
4. The method of any of clauses 1-3, where the signed lockbox file is stored in a data repository outside of the secure computing network.
5. The method of any of clauses 1-4, further comprising publishing a message to an update topic included in a message broker of the edge device.
6. The method of any of clauses 1-5, where updating the edge device comprises responding to the message in the update topic by mounting the set of update files for access by an operating system of the edge device, restarting the edge device, and updating the edge device with the mounted set of files.
7. The method of any of clauses 1-6, where updating the edge device comprises comparing a version specified by a manifest included in the signed lockbox file to a version specified by locally-stored system files, where the edge device is updated with the set of update files when the version specified by the manifest is more recent than the version specified by the locally-stored system files.
8. The method of any of clauses 1-7, further comprising publishing a message to a message broker of the edge device.
9. The method of any of clauses 1-8, where the message broker is a publisher in a publish-subscribe network, a data intake and query system is a subscriber in the publish subscribe network, and the data intake and query system receives the message from the message broker via a trusted tunnel bridge.
10. The method of any of clauses 1-9, where the data intake and query system is included in the computing network and receives the message via a private trusted tunnel bridge.
11. The method of any of clauses 1-10, further comprising transmitting, by the edge device, a pulse to the data intake and query system, where the data intake and query system, in response to receiving the pulse, causes the edge device to change an operating state of the edge device.
12. The method of any of clauses 1-11, further comprising receiving, by the edge device from the data intake and query system, an update file associated with an operation setting, wherein the edge device is registered with a user modifying the operation setting, and updating, based on the update file, at least one service operating on the edge device.

13. The method of any of clauses 1-12, where the edge device receives the update file in response to the user modifying the at least one service operating on a separate edge device.
14. The method of any of clauses 1-13, where the public network is distinct from secure computing network, and the secure computing network satisfies a first security policy that includes at least one of a first set of electronic security requirements for the secure computing network or a first set of physical security requirements for one or more devices included in the computing network.
15. The method of any of clauses 1-14, where the edge device is enclosed in a housing that provides full protection against particulates and provides full protection against full immersion in a liquid at a depth of up to 1 meter.
16. The method of any of clauses 1-15, where the edge device comprises a printed circuit board (PCB), and two or more sensors are directly disposed on the PCB.
17. In various implementations, one or more non-transitory computer-readable media store instructions that, when executed by one or more processors, cause the one or more processors to perform the steps of receiving, by an edge device in a secure computing network, a signed lockbox file from a second device, where the second device retrieves the signed lockbox file via a public network that is inaccessible from within the secure computing network, and the edge device receives the signed lockbox file from the second device when the second device is operating within the secure computing network, validating, by the edge device, a signature of the signed lockbox file, extracting a set of update files for the edge device from the signed lockbox file, and updating the edge device using the set of update files.
18. The one or more non-transitory computer-readable media of clause 17, where the signed lockbox file is signed with a first key by a signing service operating outside the secure computing network, and the edge device validates the signature using a second key corresponding to the first key.
19. In various implementations, an edge device comprises a memory storing instructions, and a processor coupled to the memory that executes the instructions by performing the steps of receiving, in a computing network, a signed lockbox file from a second device, where the second device retrieves the signed lockbox file via a public network that is inaccessible from within the computing network, and the edge device receives the signed lockbox file from the second device when the second device is operating within the computing network, validating a signature of the signed lockbox file, extracting a set of update files for the edge device from the signed lockbox file, and updating the edge device using the set of update files.
20. The edge device of clause 18, where the signed lockbox file is signed with a first key by a signing service operating outside the secure computing network, and the edge device validates the signature using a second key corresponding to the first key.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A method comprising:
   receiving device updates by an edge device in a secure computing network from a second device, the device updates indicating a latest update version for a configuration of the edge device, the latest update version being an updated configuration relative to a current update version associated with the edge device;
   publishing a first message to a message broker of the edge device indicating availability of the updated configuration based on the receiving device updates by an edge device;
   receiving an update request message by the edge device subsequent to publishing the first message;
   publishing a second message to the message broker, responsive to the update request message, indicating to commence updating of the configuration of the edge device based on the updated configuration;
   retrieving, by the edge device, a signed lockbox file from a data repository in second network separate from the secure computing network, the signed lockbox file comprising a set of update files forming the updated configuration;
   updating the edge device using the set of update files by validating the signed lockbox file by the edge device, and extracting the set of update files by the edge device from the validated signed lockbox file; and
   communicating an update completed notification by the edge device to the second device subsequent to successful completion of the updating.

2. The method of claim 1, further comprising, prior to the requesting:
   querying the data repository, by the second device based on a predetermined schedule, to retrieve the latest update version;
   determining, by the second device, whether the retrieved latest update version is updated relative to the current update version associated with the edge device; and
   updating the device updates by the second device responsive to determining that the retrieved latest update version is updated relative to the current update version.

3. The method of claim 1, wherein the receiving the update request message is from an automated service of the edge device without a user interaction.

4. The method of claim 1, further comprising:
   outputting, via a user interface of the edge device responsive to publishing the first message, a prompt asking whether a user desires to commence updating of the configuration of the edge device; and
   receiving a user interaction with the user interface of the edge device, responsive to the prompt, indicating a user request for updating of the configuration of the edge device,
   wherein the receiving the update request message is responsive to receiving the user interaction.

5. The method of claim 1, further comprising:
   directing, by the second device, outputting of a prompt via a user interface of a user device that is not in the secure computing environment and is in communication with the second device, the prompt asking whether a user desires to commence updating of the configuration of the edge device; and
   receiving a user interaction with the user interface of the user device, responsive to the prompt, indicating a user request for updating of the configuration of the edge device,
   wherein the receiving the update request message is responsive to receiving the user interaction.

6. The method of claim 1, wherein:
   the receiving the device updates is by a first service of the edge device; and
   the publishing the first message is by the first service to a first topic in the message broker of the edge device.

7. The method of claim 6, wherein:
   the publishing the second message is to a second topic in the message broker;
   a second service of the edge device is subscribed to the second topic, such that the second service automatically receives the second message; and
   the retrieving the signed lockbox file is by the second service responsive to processing the second message.

8. The method of claim 7, further comprising:
   monitoring, by the second topic during the updating, progress of the updating; and
   generating notifications causing one or more user interfaces to indicate the 3 progress of the updating based on the monitoring.

9. The method of claim 7, wherein the communicating the update completed notification comprises:
   publishing a third message by the second service to a third topic in the message broker upon the successful completion of the updating, wherein the first service is subscribed to the third topic, such that the first service automatically receives the third message; and
   communicating the update completed notification by the first service to the second device responsive to processing the third message by the first service.

10. The method of claim 1, wherein the updating the edge device further comprises:
    mounting the set of update files for access by an operating system of the edge device; and
    restarting the edge device, such that the operating system starts up with the mounted set of files.

11. The method of claim 1, wherein the second device is an on-premises device.

12. The method of claim 1, wherein the second device is a cloud-based device in communication with the edge device via a trusted tunnel bridge.

13. The method of claim 1, wherein:
    the message broker is a publisher in a publish-subscribe network;
    he second device is a subscriber in the publish-subscribe network.

14. The method of claim 1, wherein the edge device comprises:
    a printed circuit board (PCB); and
    two or more sensors are directly disposed on the PCB.

15. One or more non-transitory computer-readable media storing instructions that, when executed by one or more processors, cause the one or more processors to perform the steps of:
    receiving device updates by an edge device in a secure computing network from a second device, the device updates indicating a latest update version for a configuration of the edge device, the latest update version being an updated configuration relative to a current update version associated with the edge device;

publishing a first message to a message broker of the edge device indicating availability of the updated configuration based on the receiving;

receiving an update request message by the edge device subsequent to publishing the first message;

publishing a second message to the message broker, responsive to the update request message, indicating to commence updating the configuration of the edge device based on the updated configuration;

retrieving a signed lockbox file by the edge device from a data repository in second network separate from the secure computing network, the signed lockbox file comprising a set of update files forming the updated configuration;

updating the edge device using the set of update files by validating the signed lockbox file by the edge device, and extracting the set of update files by the edge device from the validated signed lockbox file; and communicating an update completed notification by the edge device to the second device subsequent to successful completion of the updating.

16. The one or more non-transitory computer-readable media of claim 15, wherein the instructions, when executed by the one or more processors, cause the one or more processors to perform the steps further of:

outputting, via a user interface, responsive to publishing the first message, a prompt asking whether a user desires to commence updating of the configuration of the edge device; and receiving a user interaction with the user interface, responsive to the prompt, indicating a user request for updating of the configuration of the edge device, wherein the receiving the update request message is responsive to receiving the user interaction.

17. The one or more non-transitory computer-readable media of claim 15, wherein:

the receiving the device updates is by a first service of the edge device;

the publishing the first message is by the first service to a first topic in the message broker of the edge device;

the publishing the second message is to a second topic in the message broker;

a second service of the edge device is subscribed to the second topic, such that the second service automatically receives the second message;

the retrieving the signed lockbox file is by the second service responsive to processing the second message; and the communicating the update completed notification comprises:

publishing a third message by the second service to a third topic in the message broker upon the successful completion of the updating, wherein the first service is subscribed to the third topic, such that the first service automatically receives the third message; and communicating the update completed notification by the first service to the second device responsive to processing the third message by the first service.

18. An edge device comprising:
a memory storing instructions; and
a processor coupled to the memory that executes the instructions by performing the steps of:

receiving device updates by an edge device in a secure computing network from a second device, the device updates indicating a latest update version for a configuration of the edge device, the latest update version being an updated configuration relative to a current update version associated with the edge device;

publishing a first message to a message broker of the edge device indicating availability of the updated configuration based on the receiving;

receiving an update request message by the edge device subsequent to publishing the first message;

publishing a second message to the message broker, responsive to the update request message, indicating to commence updating the configuration of the edge device based on the updated configuration;

retrieving a signed lockbox file by the edge device from a data repository in second network separate from the secure computing network, the signed lockbox file comprising a set of update files forming the updated configuration;

updating the edge device using the set of update files by validating the signed lockbox file by the edge device, and extracting the set of update files by the edge device from the validated signed lockbox file; and communicating an update completed notification by the edge device to the second device subsequent to successful completion of the updating.

19. The edge device of claim 18, wherein the processor executes the instructions by performing the steps further of:

outputting, via a user interface, responsive to publishing the first message, a prompt asking whether a user desires to commence updating of the configuration of the edge device; and receiving a user interaction with the user interface, responsive to the prompt, indicating a user request for updating of the configuration of the edge device, wherein the receiving the update request message is responsive to receiving the user interaction.

20. The edge device of claim 18, wherein:

the receiving the device updates is by a first service of the edge device;

the publishing the first message is by the first service to a first topic in the message broker of the edge device;

the publishing the second message is to a second topic in the message broker;

a second service of the edge device is subscribed to the second topic, such that the second service automatically receives the second message;

the retrieving the signed lockbox file is by the second service responsive to processing the second message; and the communicating the update completed notification comprises:

publishing a third message by the second service to a third topic in the message broker upon the successful completion of the updating, wherein the first service is subscribed to the third topic, such that the first service automatically receives the third message; and communicating the update completed notification by the first service to the second device responsive to processing the third message by the first service.

* * * * *